(12) United States Patent
Ohnishi et al.

(10) Patent No.: US 12,498,789 B2
(45) Date of Patent: Dec. 16, 2025

(54) OPERATIONAL DATA MANAGEMENT SYSTEM, OPERATIONAL DATA MANAGEMENT METHOD, AND STORAGE MEDIUM

(71) Applicants: KEIO UNIVERSITY, Tokyo (JP); Motion Lib, Inc., Kawasaki (JP)

(72) Inventors: Kouhei Ohnishi, Kanagawa (JP); Takahiro Mizoguchi, Kanagawa (JP); Wataru Iida, Kanagawa (JP); Genki Kokubun, Kanagawa (JP)

(73) Assignees: KEIO UNIVERSITY, Tokyo (JP); MOTION LIB, INC., Kanagawa (JP)

( * ) Notice: Subject to any disclaimer, the term of this patent is extended or adjusted under 35 U.S.C. 154(b) by 178 days.

(21) Appl. No.: 18/573,637

(22) PCT Filed: Jun. 8, 2022

(86) PCT No.: PCT/JP2022/023200
§ 371 (c)(1),
(2) Date: Dec. 22, 2023

(87) PCT Pub. No.: WO2022/270319
PCT Pub. Date: Dec. 29, 2022

(65) Prior Publication Data
US 2024/0302900 A1    Sep. 12, 2024

(30) Foreign Application Priority Data
Jun. 25, 2021   (JP) .................................. 2021-106171

(51) Int. Cl.
*H04B 3/36* (2006.01)
*B25J 13/08* (2006.01)
*G06F 3/01* (2006.01)

(52) U.S. Cl.
CPC ............ *G06F 3/016* (2013.01); *B25J 13/084* (2013.01)

(58) Field of Classification Search
CPC .. G06F 3/016; B25J 13/084; B25J 3/00; B25J 13/00
See application file for complete search history.

(56) References Cited

U.S. PATENT DOCUMENTS 11,351,005 B2 *   6/2022   Itkowitz .................. G06F 3/017
11,931,118 B1 *   3/2024   Roh ........................ A61B 34/25
(Continued)

FOREIGN PATENT DOCUMENTS

JP   H06209902 A    8/1994
JP   H08145007 A    6/1996
(Continued)

OTHER PUBLICATIONS

International Search Report (ISR) (and English language translation thereof) dated Aug. 16, 2022, issued in International Application No. PCT/JP2022/023200.

(Continued)

*Primary Examiner* — Toan N Pham
(74) *Attorney, Agent, or Firm* — Holtz, Holtz & Volek PC

(57) ABSTRACT

An operational data management system includes an operational data acquisition unit, a tag assigner, and a database management unit. The operational data acquisition unit acquires, as operational data, time-series control parameters used to transmit force tactile sensation between devices. The tag assigner assigns, as identification information, information related to operation content implemented by the operational data to the operational data acquired by the operational data acquisition unit. The database management unit accumulates a plurality of pieces of operational data assigned identification information by the tag assigner, and (Continued)

manages the operational data so that desired operational data is searchable from the accumulated plurality of pieces of operational data based on the identification information.

9 Claims, 14 Drawing Sheets

(56) References Cited

U.S. PATENT DOCUMENTS

| | | |
|---|---|---|
| 2007/0112466 A1 | 5/2007 | Ohnishi et al. |
| 2009/0110533 A1 | 4/2009 | Jinno |
| 2012/0191460 A1 | 7/2012 | Ng-Thow-Hing et al. |
| 2014/0320629 A1* | 10/2014 | Chizeck .............. G06T 15/04 348/81 |
| 2015/0137727 A1 | 5/2015 | Furutani et al. |
| 2016/0207196 A1 | 7/2016 | Ohnishi et al. |
| 2019/0143510 A1 | 5/2019 | Ohnishi et al. |
| 2020/0139539 A1 | 5/2020 | Hasunuma et al. |
| 2020/0376681 A1 | 12/2020 | Ohnishi et al. |
| 2021/0107134 A1 | 4/2021 | Shimono et al. |
| 2021/0282795 A1 | 9/2021 | Shimono et al. |
| 2021/0334336 A1 | 10/2021 | Ohnishi et al. |
| 2022/0134542 A1 | 5/2022 | Ohnishi et al. |
| 2023/0134614 A1 | 5/2023 | Ohnishi et al. |
| 2023/0141048 A1 | 5/2023 | Ohnishi et al. |
| 2023/0143373 A1 | 5/2023 | Shimono et al. |

FOREIGN PATENT DOCUMENTS

| | | |
|---|---|---|
| JP | 2000047567 A | 2/2000 |
| JP | 2002312003 A | 10/2002 |
| JP | 2007274783 A | 10/2007 |
| JP | 2009107095 A | 5/2009 |
| JP | 2009279699 A | 12/2009 |
| JP | 2009289179 A | 12/2009 |
| JP | 2011174871 A | 9/2011 |
| JP | 2014504959 A | 2/2014 |
| JP | 2018206286 A | 12/2018 |
| WO | 2005109139 A1 | 11/2005 |
| WO | 2013108356 A1 | 7/2013 |
| WO | 2015041046 A1 | 3/2015 |
| WO | 2021025087 A1 | 2/2021 |
| WO | 2021172572 A1 | 9/2021 |
| WO | 2021172580 A1 | 9/2021 |
| WO | 2021200881 A1 | 10/2021 |
| WO | 2022230594 A1 | 11/2022 |

OTHER PUBLICATIONS

Written Opinion dated Aug. 16, 2022, issued in International Application No. PCT/JP2022/023200.

* cited by examiner

OPERATIONAL DATA MANAGEMENT SYSTEM, OPERATIONAL DATA MANAGEMENT METHOD, AND STORAGE MEDIUM

TECHNICAL FIELD

The present invention relates to an operational data management system, an operational data management method, and a storage medium.

BACKGROUND ART

Techniques have been used to digitize force tactile sensation (e.g., hardness and softness of an object) when in contact with an object into data to implement transmission of the force tactile sensation between devices. Thus, for example, it is possible to transmit force tactile sensation bi-directionally between one device that receives an operation from a user and the other device that performs work involving contact with an object.

An example of such a technique is disclosed in PTL 1. With the technique disclosed in PTL 1, force tactile sensation perceived when an object is gripped by a robot manipulator is digitized into data, which allows the force tactile sensation to be transmitted to a multi-finger device worn by a user.

CITATION LIST

Patent Literature

[PTL 1]
Japanese Unexamined Patent Application Publication No. 2009-289179

SUMMARY OF INVENTION

Technical Problem

Meanwhile, data related to force tactile sensation generated by the technique of PTL 1 and the like can probably be used for application such as analysis and implementation of operation by a user in addition to application for transmission of force tactile sensation in real time.

However, such data related to force tactile sensation is data in which the values of time-series control parameters are simply listed, and formally arranged information such as record date and time is added, thus it is difficult for a user to grasp the content easily. Under such circumstances, in order to utilize data related to force tactile sensation, it is necessary to manage the data related to force tactile sensation more appropriately.

Solution to Problem

An operational data management system includes:
an acquirer that acquires, as operational data, a time-series control parameter used to transmit force tactile sensation between devices;
an assignor that assigns, as identification information, information on operation content implemented by the operational data to the operational data acquired by the acquisition unit; and
a manager that accumulates a plurality of pieces of operational data, each of which is assigned the identification information by the assignor, and that manages the plurality of pieces of operational data so that desired operational data is searchable from the accumulated plurality of pieces of operational data based on the identification information.

Advantageous Effects of Invention

According to the present invention, the data related to force tactile sensation can be managed more appropriately.

DESCRIPTION OF EMBODIMENTS

Hereinafter, an example of an embodiment of the present invention will be described with reference to the accompanying drawings.

System Configuration

Figure 1:
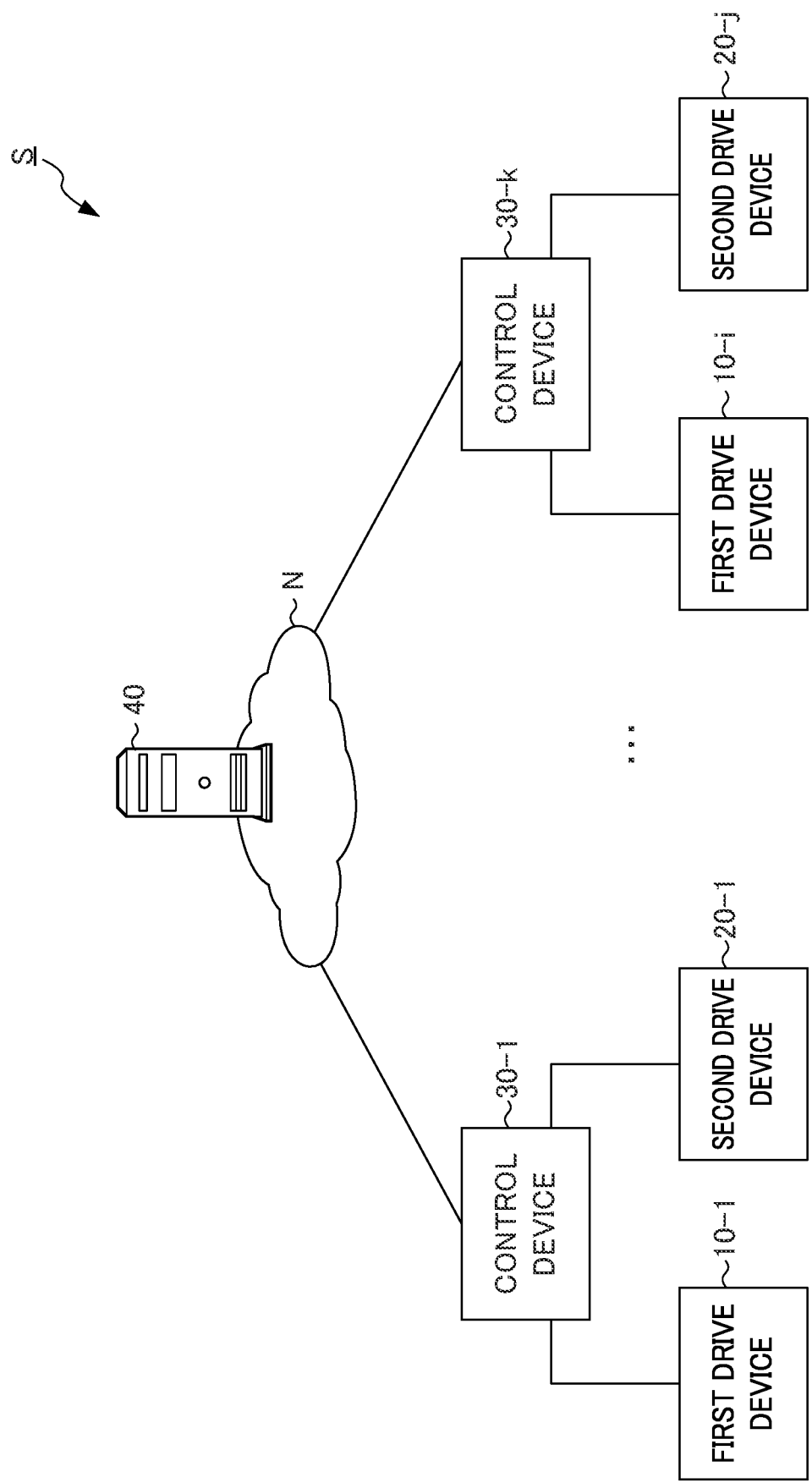
FIG. 1 is a block diagram showing the entire configuration of operational data management system S according to the present embodiment.

FIG. 1 is a block diagram showing the entire configuration of operational data management system S according to the present embodiment. As shown in FIG. 1, the operational data management system S includes a plurality of sets each consisting of a first drive device 10, a second drive device 20, and a control device 30, as a local system. In addition, the operational data management system S includes an operational data management device 40 as a high-order system.

In each set, the first drive device 10 and the second drive device 20 are communicatively connected to the control device 30 by a wire or wirelessly. In addition, the control device 30 and the operational data management device 40 are communicatively connected via a network N. The network N is implemented by, for example, a wired or wireless network such as a LAN (Local Area Network) and the Internet.

However, this form of communication connection is only an example. For example, in each set, the first drive device 10 and the second drive device 20 may be communicatively connected to the control device 30 via the network N or another network. Besides, for example, each control device 30 may be communicatively connected to the operational data management device 40 not via the network N.

Note that i, j and k appended to the ends of the symbols of the first drive device 10, the second drive device 20, and the control device 30 are each any integer value greater than or equal to 1, and may be the same value or may be different values. In other words, in each set, all of the first drive device 10, the second drive device 20, and the control device 30 may be included, or only part of them may be included. For example, some sets may include the control device 30, and one of the first drive device 10 and the second drive device 20. Besides, for example, some sets may include one control device, and a plurality of pairs of the first drive device 10 and the second drive device 20.

In such a system configuration, the first drive device 10 operates as a master device, thereby driving a first mechanism that receives an operation from a user. In contrast, the second drive device 20 operates as a slave device, thereby driving a second mechanism that performs an operation involving contact with an object.

In this case, the control device 30 performs control (bilateral control) over transmission of force tactile sensation between the first mechanism driven by the first drive device 10 and the second mechanism driven by the second drive device 20. Thus, an operation (input of a position and a force) of a user to the first mechanism is transmitted to the second mechanism, and a reaction force (response of a position and a force) from the second mechanism is transmitted to the first mechanism.

In addition, the control device 30 obtains, as operational data, time-series control parameters used to transmit force tactile sensation between devices by the bilateral control. The control device 30 then transmits the operational data to the operational data management device 40.

The operational data management device 40 accumulates and manages the operational data received from the control device 30. The operational data management device enables browsing and searching of the operational data that is managed, and provides desired operational data to the control device 30 that utilizes the operational data.

Process Overview

Next, an overview of each of a plurality of processes performed by the operational data management system S will be described with reference to the overview diagrams of FIG. 2 to FIG. 5.

Figure 2:
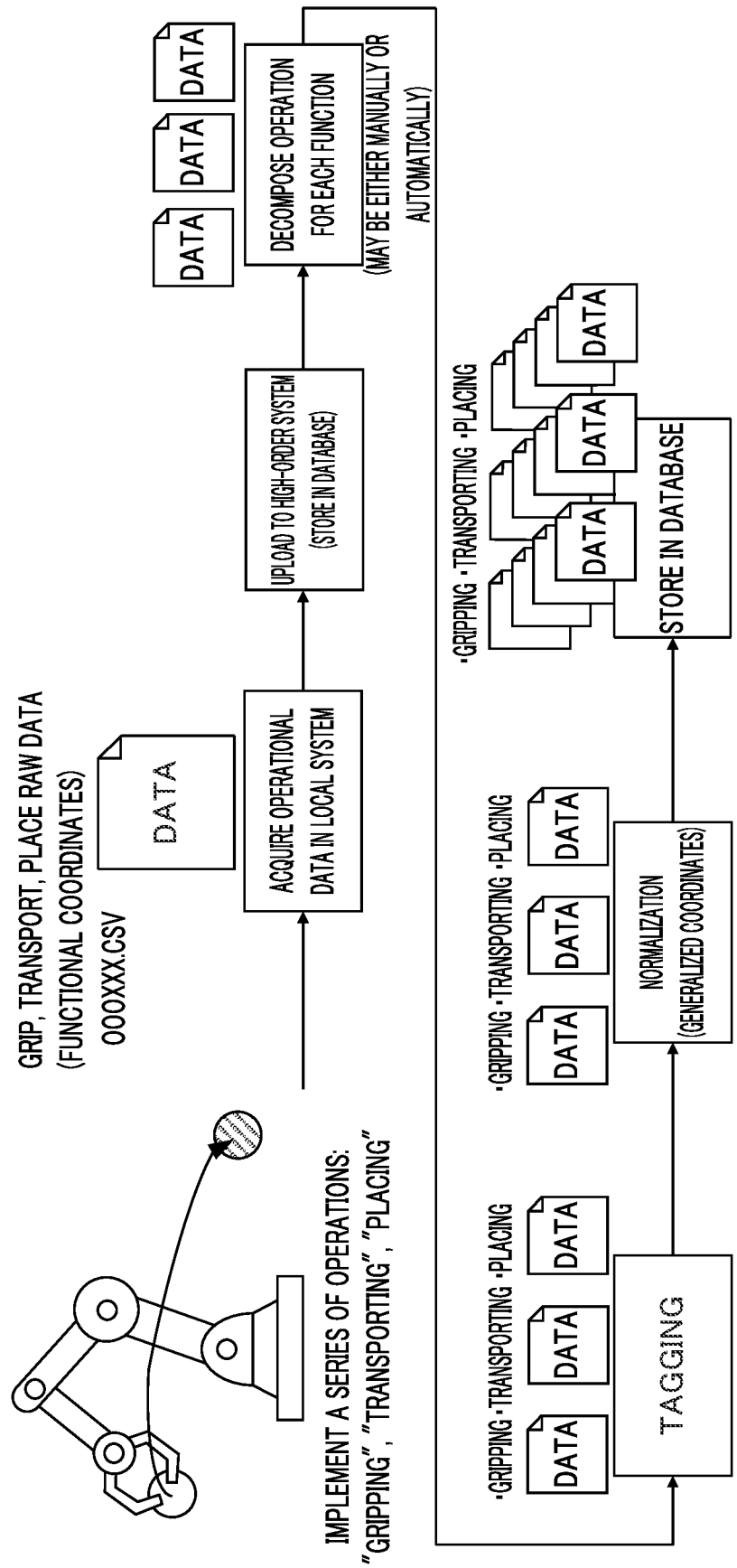
FIG. 2 is an overview diagram showing an "operational data accumulation process" of classifying and accumulating, as content, the operational data received from the control device 30.

Specifically, FIG. 2 is an overview diagram showing an "operational data accumulation process" of classifying and accumulating, as content, the operational data received from the control device 30.

Figure 3:
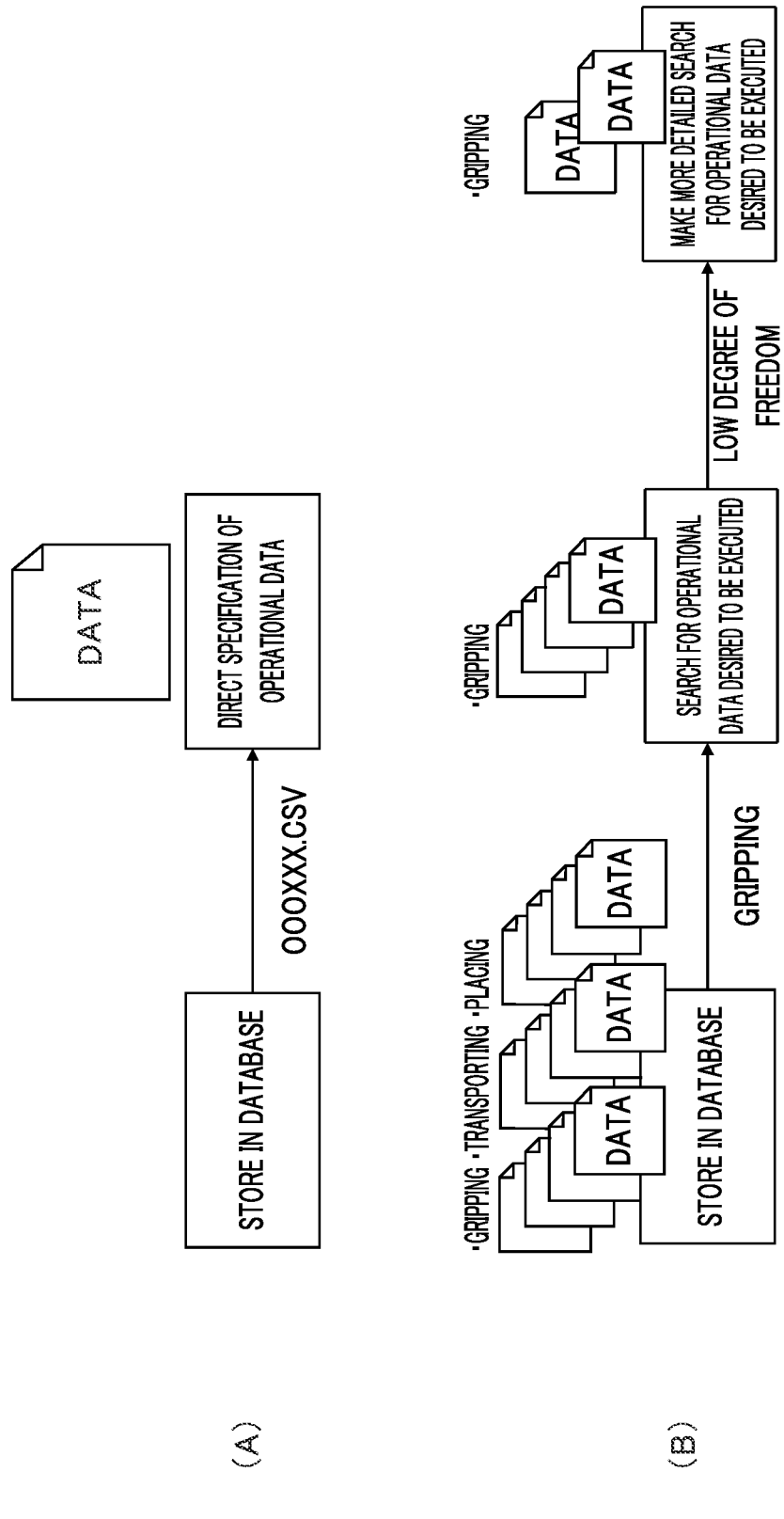
FIG. 3 is an overview diagram showing an "operational data search process" of searching for operational data that is accumulated as content.

FIG. 3 is an overview diagram showing an "operational data search process" of searching for operational data that is accumulated as content.

Figure 4:
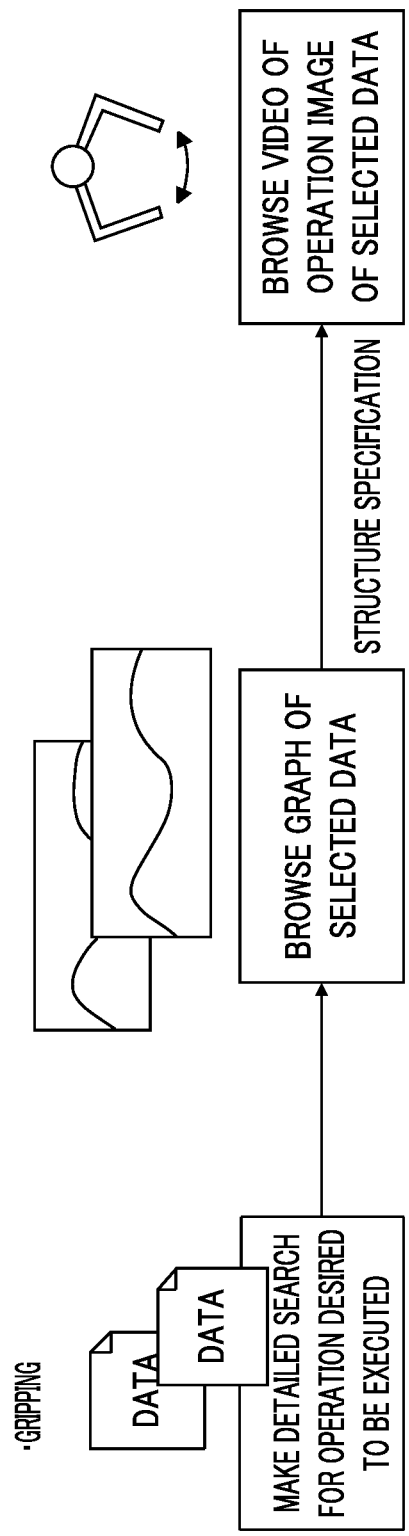
FIG. 4 is an overview diagram showing an "operational data browsing process" of browsing the operational data accumulated as content.

Furthermore, FIG. 4 is an overview diagram showing an "operational data browsing process" of browsing the operational data accumulated as content.

Figure 5:
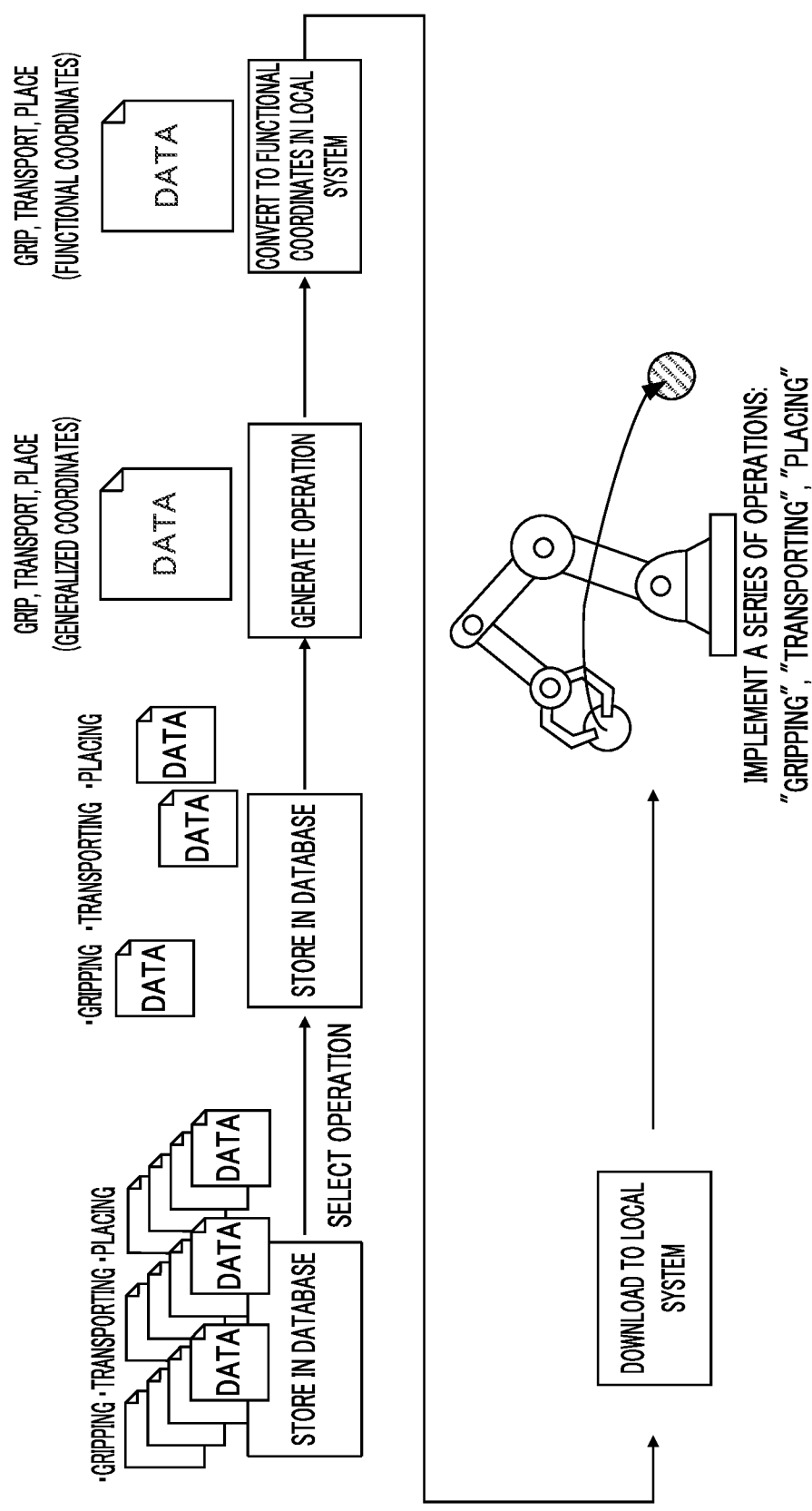
FIG. 5 is an overview diagram showing an "operational data generation process" of generating new operational data from the operational data accumulated as content, and an "operational data provision process" of providing the operational data to the control device 30 as the result of each process.

Furthermore, FIG. 5 is an overview diagram showing an "operational data generation process" of generating new operational data from the operational data accumulated as content, and an "operational data provision process" of providing the operational data to the control device 30 as the result of each process.

As shown in FIG. 2, in the operational data accumulation process, a predetermined operation is implemented in the first drive device 10 and the second drive device 20 by the control device 30 using a control parameter to transmit force tactile sensation. Here, as an example, a series of operations, that are "gripping", "transporting", and "placing" by the second drive device 20 are implemented.

The control device 30 obtains, as the operational data, time-series control parameters used to implement the series of operations. The operational data at this point is raw data corresponding to the attributes (e.g., the type, number of axes, movable range, torque output range, and sampling cycle of a device) of a device (e.g., the second drive device 20) that implements the operations. The control device 30 of a local system uploads the operational data by transmitting the data to the operational data management device 40 in the high-order system. Note that operational data corresponding to the attribute of a device in a local system, such as the uploaded operational data is referred to as "operational data in functional coordinates" as appropriate below.

The operational data management device 40 decomposes the operational data uploaded by the control device 30 based on the operation content implemented by the operational data. Here, as an example, the operational data is decomposed for each type (in other words, for each function) of the operation content.

In addition, the operational data management device 40 assigns information on the operation content to each decomposed piece of the operational data as identification information. Here, as an example, tagging is performed by assigning the name of a type (in other words, a function) of the operation content to the operational data as a tag serving as identification information.

Note that the decomposition and the assignment of identification information may be manually executed based on an instruction operation by a user, or may be automatically executed by a classifier or AI (artificial intelligence) produced by machine learning or rule base.

Furthermore, the operational data management device 40 normalizes each operational data, thereby implementing generalized coordinates for operational data corresponding to functional coordinates. The operational data management device 40 then accumulates the operational data by storing it in a database. Note that general operational data unspecialized for the attributes of a particular device, such as the operational data after the normalization is referred to as "operational data in generalized coordinates" as appropriate below.

In this manner, the operational data accumulation process allows the operational data to be accumulated as if it is content by performing tagging and normalization.

As shown in FIG. 3, in the operational data search process, the operational data management device 40 can search for operational data by a plurality of methods. For example, as shown in FIG. 3(A), the operational data management device 40 may allow a user to search for operational data stored in a database through direct specification of the operational data by a method of inputting a file name to a search field. Here, as an example, search is made by directly specifying corresponding operational data by the file name called "OOOXXX.CSV".

Alternatively, as shown in FIG. 3(B), the operational data management device 40 may make the operational data stored in a database searchable based on tag, that is, by a user selecting a desired tag. In addition, a plurality of pieces of operational data searched in this manner may be made searchable by further making selection with another tag so that the operational data is further narrowed down. Here, as an example, a plurality of pieces of operational data retrieved by the tag called "gripping" is further narrowed down by the tag called "low degree of freedom".

In this case, filtering may be performed so that the operational data not applicable to the attributes of a device (e.g., the second drive device 20) which is assumed to utilize the operational data searched by a user, and the attributes (e.g., the material, weight and size) of a target contact object in this operation is excluded from the search target.

In this manner, the operational data search process makes it possible to easily search for the operational data desired by a user by performing search using a tag and filtering.

As shown in FIG. 4, in the operational data browsing process, the operational data management device 40 visualizes the operational data retrieved in the operational data search process, and displays the operational data to a user. Here, as an example, change in the time series of control parameters in the operational data is converted to a graph which is displayed.

Besides, for example, the operational data management device 40 transmits force tactile sensation to a virtual device through the operational data, thereby implementing the operation of the virtual device. The operational data management device 40 then displays the implemented operation of the virtual device. In other words, the operational data management device 40 displays a simulation result of the operation implemented by the operational data as a video. In this case, the operational data management device 40 makes a simulation by a virtual device in a general structure corresponding to tags for the operational data. For example, when the function assigned a tag is "gripping", a simulation is made by a virtual manipulator in a general structure including a gripping mechanism for gripping.

In this manner, the operational data browsing process can display the operational data to support the search by a user in an intuitively graspable form for the user, such as operational data converted to a graph, and a video of the operation through simulation by a virtual device.

As shown in FIG. 5, in the operational data generation process, along with the above-described search by the operational data search process and the display by the operational data browsing process, the operational data management device 40 links a plurality of pieces of operational data selected by a user in the order set by the user, thereby generating single operational data including the plurality of pieces of operational data as the components. In addition, the operational data management device 40 denormalizes the generated operational data, thereby converting the operational data in generalized coordinates to operational data in functional coordinates corresponding to the local system that provides the operational data.

Subsequently, in the operational data provision process, the operational data management device 40 transmits and downloads the operational data after the conversion to the control device 30 in the local system. In other words, the operational data management device 40 provides the operational data.

The control device 30 provided with the operational data in functional coordinates corresponding to the local system through the download converts the operational data to operational data in robot coordinates (e.g., joint coordinates of the second drive device 20) corresponding to a device (e.g., the second drive device 20) of the local system. Through this conversion, the operational data in functional coordinates corresponding to a predetermined function (e.g., gripping) can be represented by a matrix indicating a combination of axes of the robot coordinates. The control device 30 transmits force tactile sensation to a device (e.g., the second drive device 20) based on the operational data in the robot coordinates after the conversion, thereby implementing the operation of the function corresponding to the operational data. Here, as an example, a series of operations, that are "gripping", "transporting", and "placing" by the second drive device 20 are implemented.

Thus, according to a selection of a user, the operational data generation process can generate single continuous pieces of operational data from a plurality of pieces of operational data, and convert to the operational data in functional coordinates corresponding to the local system that provides the operational data. In addition, the operational data provision process can implement an operation corresponding to the operational data by providing the local system at the provision destination with operational data applicable to the local system.

As described above, the operational data management system S assigns information on operation content to operational data as identification information by executing each process, and manages the operational data so that desired operational data is searchable by the identification information. Consequently, a user can perform search based on information (e.g., the function of an operation, and an operational condition) on operation content, that is, information easily grasped. In other words, the operational data management system S treats each of the pieces of operational data as a content, and manages the content as a library, thereby making it possible to improve the convenience of users and utilize the operational data.

Therefore, the operational data management system S can solve the problem, that is, to manage the data related to force tactile sensation more appropriately.

Device Configuration

Next, the configuration of each device included in the operational data management system S will be described.

Figure 6:
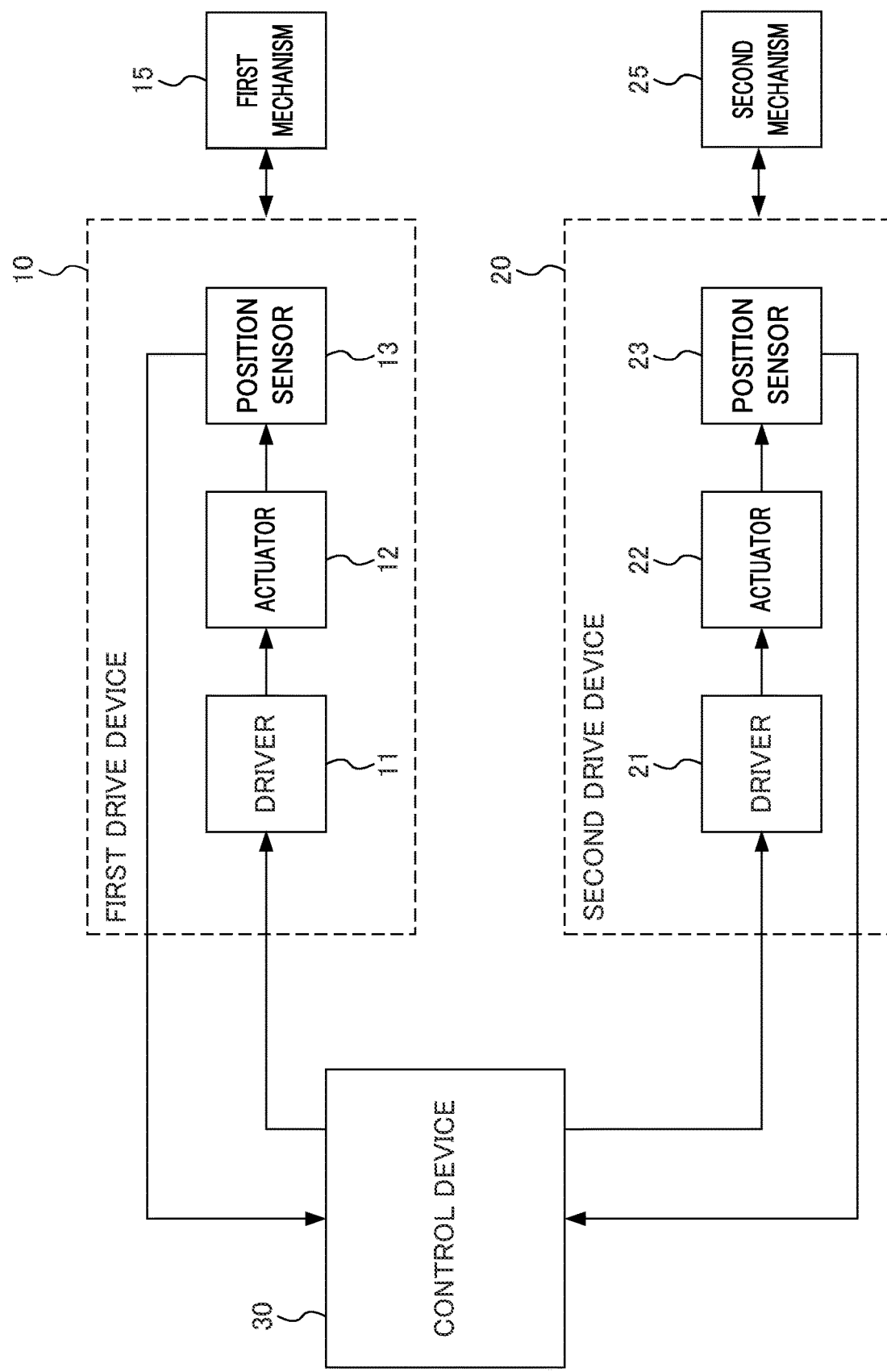
FIG. 6 is a block diagram showing the hardware configuration and the functional configuration of the first drive device 10, and the second drive device 20.

FIG. 6 is a block diagram showing the hardware configuration and the functional configuration of the first drive device 10, and the second drive device 20.

As shown in FIG. 6, the first drive device 10 includes an actuator 12 that drives the first mechanism 15, a driver 11 that drives the actuator 12, and a position sensor 13 that detects the position of a movement object moved by the actuator 12. The second drive device 20 includes an actuator 22 that drives the second mechanism 25, a driver 21 that drives the actuator 22, and a position sensor 23 that detects the position of a movement object moved by the actuator 22.

In this case, the position of a movement object detected by the position sensor 13 is, for example, the position of a predetermined part of the first mechanism 15, and the position of a predetermined part of a user who operates the first mechanism 15. The position of a movement object detected by the position sensor 23 is, for example, the position of a predetermined part of the second mechanism 25, and the position of a predetermined part of a target object which is to be touched, and gripped, processed or moved by the second mechanism 25.

However, in the present embodiment, instead of the positions of these movement objects, the rotation angle of the output shaft of each actuator may be detected by a rotary encoder built-in the actuator. In other words, in the present embodiment, the concept of position is supposed to include angle (e.g., the rotation angle of the output shaft of an actuator), and information related to position is supposed to include position, angle, velocity, angular velocity, acceleration and angular acceleration. Position and velocity (or acceleration) or angle and angular velocity (or angular acceleration) are parameters replaceable by a calculus operation, thus when a process related to position or angle is performed, the process can be performed after the position or angle is replaced by velocity or angular velocity as appropriate.

The first mechanism 15 is a mechanism that functions as an operational tool that receives an operation of a user, and its shape and structure are not limited to particular ones. For example, the first mechanism 15 is implemented by a controller equipped with a variable unit that receives an operation of a user, or a hand/finger shaped device worn by a user. The second mechanism 25 is a mechanism that comes into contact with an object to grip, process, or move the object, and its shape and structure are not limited to particular ones. For example, the second mechanism 25 is implemented by a robot manipulator that comes into contact with an object to grip or move the object, or a robot arm equipped with (or mounted with a tool) a tool for processing an object.

Figure 7:
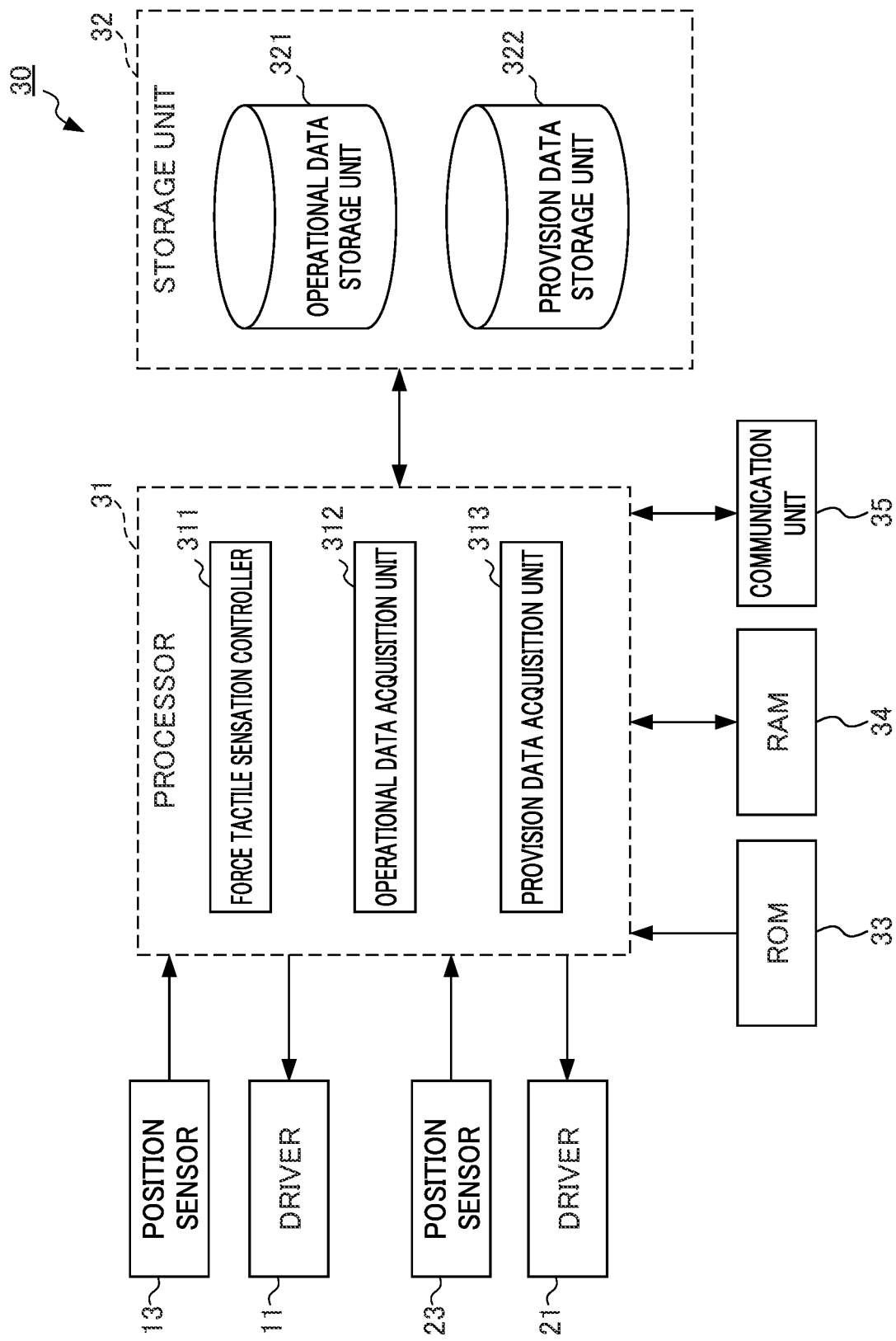
FIG. 7 is a block diagram showing the hardware configuration and the functional configuration of the control device 30.

FIG. 7 is a block diagram showing the hardware configuration and the functional configuration of the control device 30.

As shown in FIG. 7, the control device 30 includes a processor 31, a storage unit 32, a RCM (Read Only Memory) 33, a RAM (Random Access Memory) 34, and a communication unit 35.

The processor 31 is comprised of an arithmetic unit such as a CPU (Central Processing Unit), and executes various processes in accordance with a program recorded on the ROM 33, or a program loaded from the storage unit 32 to the RAM 34.

Data necessary for the processor 31 to execute various processes is also stored in the RAM 34 as appropriate.

The processor 31 is connected to the ROM 33, and RAM 34 each other via a bus which is not illustrated. The bus is further connected to the storage unit 32, and the communication unit 35.

In the processor 31, the position sensor 13, the driver 11, the position sensor 23, and the driver 21 are connected to each other via a signal line. On this connection path, a circuit to implement sending and receiving of signals, such as a D/A (digital to analog) converter circuit and an A/D (analog to digital) converter circuit, and a pulse counter or the like are disposed as appropriate. Sending and receiving of signals via the signal line may be implemented by parallel communication, or implemented by serial communication.

The storage unit 32 is comprised of a hard disk or a DRAM (Dynamic Random Access Memory), and stores various data.

The communication unit 35 controls the communication performed with other devices.

When the various processes described above with reference to FIG. 2 to FIG. 5 are performed, a force tactile sensation controller 311, an operational data acquisition unit 312, and a provision data acquisition unit 313 function in the processor 31. An operational data storage unit 321 and a provision data storage unit 322 are formed in the storage unit 32.

In also a case not particularly mentioned below, data necessary to implement a process is transmitted and received between these functional blocks at an appropriate timing as needed.

Note that in this case, the force tactile sensation controller 311 may be operated by a general-purpose processor 31 performing arithmetic processing; however, the force tactile sensation controller 311 may be operated by a dedicated integrated circuit (IC) that can perform a process to operate the force tactile sensation controller 311 stably at a high speed.

The force tactile sensation controller 311 outputs a control command to the driver 11 or the driver 21 based on the information on the position detected by the position sensor 13 or the position sensor 23, thereby implementing control over transmission of force tactile sensation between the first drive device 10 which is a master device, and the second drive device 20 which is a slave device.

As a control method for transmission of force tactile sensation performed by the force tactile sensation controller 311, two control methods are assumed: "actual operation transmission control" and "data transmission control".

Here, the actual operation transmission control is a control method by which both the master device (here, the first drive device 10), and the slave device (here, the second drive device 20) are actually driven, and force tactile sensation accompanying the actual drive is transmitted based on the positions detected in real time by the position sensors (e.g., the position sensor 13 and the position sensor 23) of the actually driven master device and slave device, and on the force calculated from these positions.

In contrast, the data transmission control is a control method by which only one of the master device (here, the first drive device 10), and the slave device (here, the second drive device 20) is actually driven, and force tactile sensation is transmitted based on the position detected in real time by the position sensor (e.g., one of the position sensor 13 and the position sensor 23) of the actually driven one of the master device and the slave device, on a force calculated from the position, and on the operational data in functional coordinates provided from the operational data management device 40 to implement the operation of the one of the master device and the slave device. Note that the operational data in functional coordinates provided from the operational data management device 40 for the data transmission control is referred to as "provision data" as appropriate below.

Specifically, when the actual operation transmission control is performed, the force tactile sensation controller 311 performs control over transmission of force tactile sensation bi-directionally between the actuator 12 of the first drive device 10 and the actuator 22 of the second drive device 20.

For this purpose, the force tactile sensation controller 311 obtains the position (specifically, the position or the angle) of a movement object moved by the actuator 12 from the position sensor 13, and the position (specifically, the position or the angle) of a movement object moved by the actuator 22 from the position sensor 23.

In contrast, when the data transmission control is performed, the force tactile sensation controller 311 performs control to implement the operation in accordance with the provision data in the actuator 22 (or the actuator 12) based on the provision data for controlling the operation of the second drive device 20 (or the provision data for controlling the operation of the first drive device 10). In short, the force tactile sensation controller 311 performs control over transmission of force tactile sensation to the actuator 22 (or the actuator 12) based on the provision data.

For this purpose, the force tactile sensation controller 311 obtains the position (specifically, the position or the angle) of a movement object moved by the actuator 22 (or the actuator 12) from the position sensor 23 (or the position sensor 13), and obtains provision data for controlling the operation of the second drive device 20 (or provision data for controlling the operation of the first drive device 10). As described above, the provision data is provided from the operational data management device 40.

In this manner, in the actual operation transmission control and the data transmission control, the position (angle) and the provision data obtained by the force tactile sensation controller 311 are used as reference values for controlling the operation of the first drive device 10 and the second drive device 20 in a control algorithm for transmission of force tactile sensation. The control algorithm for transmission of force tactile sensation will be described in detail with reference to FIG. 8.

Figure 8:
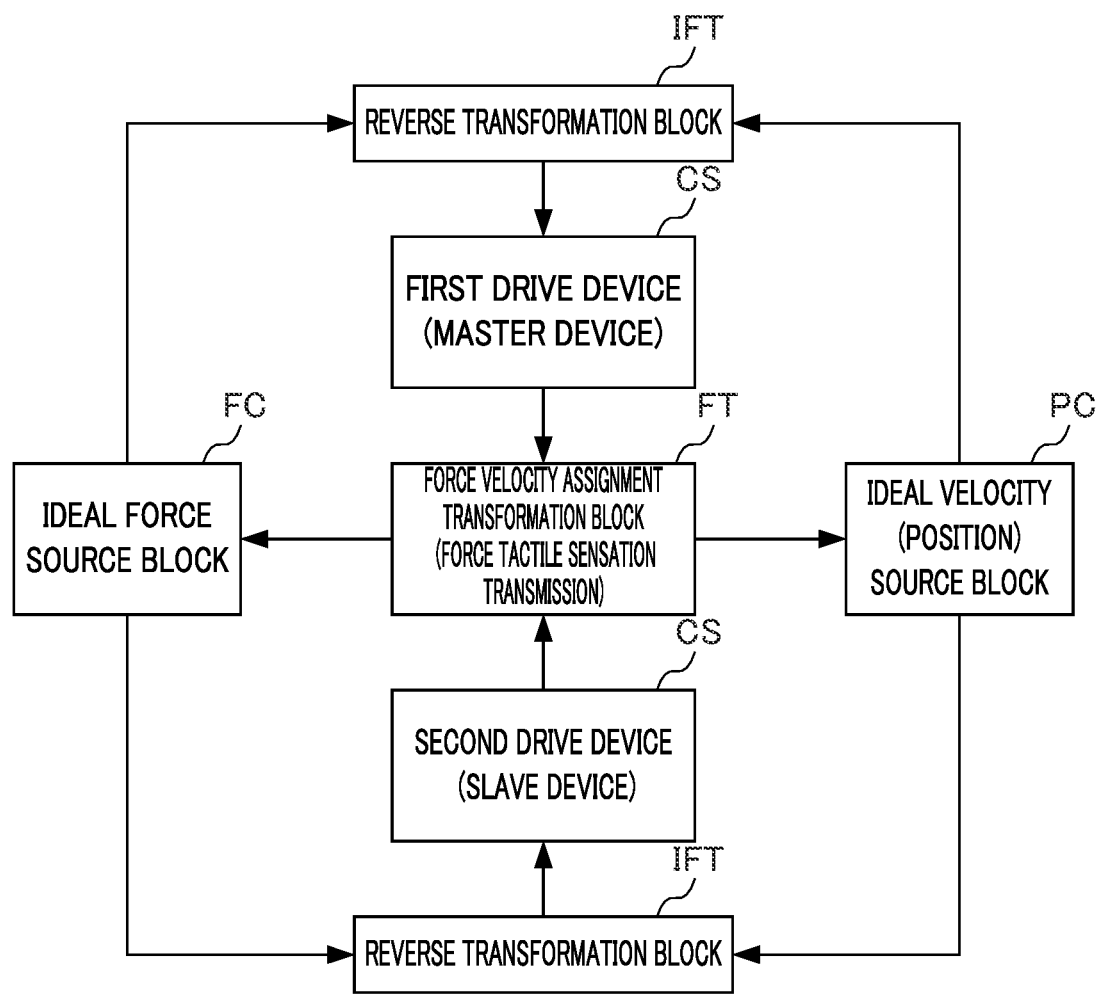
FIG. 8 is a block diagram showing a control algorithm to transmit force tactile sensation in the force tactile sensation controller 311.

FIG. 8 is a block diagram showing a control algorithm to transmit force tactile sensation in the force tactile sensation controller 311. As shown in FIG. 8, the control algorithm implemented in the force tactile sensation controller 311 is expressed as a control law including a functional force velocity assignment transformation block FT, at least one of an ideal force source block FC or an ideal velocity (position) source block PC, and a reverse transformation block IFT. Note that in the present embodiment, a control target system CS is constituted by the first drive device 10 and the second drive device 20.

The functional force velocity assignment transformation block FT is a block that defines the transformation of a control energy to a region of velocity (position) and force which are set according to the function of the control target system CS. Specifically, in the functional force velocity assignment transformation block FT, values (reference values) which serve as a reference of the function of the control target system CS, and a coordinate transformation with an input of the current positions (or the current angles) of the actuator 12 and the actuator 22 are defined. In general, the coordinate transformation transforms an input vector with elements of reference value and current position (current angle) to an output vector consisting of positions (angles) for calculating a control target value of position (angle), and transforms an input vector with elements of reference value and the current force to an output vector consisting of forces for calculating a control target value of force.

A force tactile sensation transmission function between the first drive device 10 and the second drive device 20 can be implemented by setting the coordinate transformation in the functional force velocity assignment transformation block FT to content indicating the force tactile sensation transmission function, and the operation of transmitting force tactile sensation can be controlled by the second drive device 20 without using the first drive device 10. Scaling of position (angle) or force can be performed by setting coefficients to the elements of a transformation matrix in the coordinate transformation in the functional force velocity assignment transformation block FT.

Specifically, in the present embodiment, in the functional force velocity assignment transformation block FT, variables (variables on the actual space) of the actuator 12 and the actuator 22 as single bodies are "transformed" to a variable group (variables on the space after coordinate transformation) of the entire system that represents the force tactile sensation transmission function, and the control energy is assigned to control energy for position (angle) and control energy for force. In other words, the coordinate transformation set in the functional force velocity assignment transformation block FT transforms the coordinates (oblique coordinates) of an actual space in which position (angle) and force are related to each other into the coordinates (orthogonal coordinates) of a virtual space in which position (angle) and force are independent from each other. Thus, as compared to when control is performed with the variables (variables on the actual space) of the actuator as a single body as they are, it is possible to provide the control energy for position (angle) and the control energy for force independently, in other words, to control position (angle) and force independently.

In the present embodiment, here, when the position (angle) and the force output by the first drive device 10 are controlled, a state value in the space after a coordinate transformation can be calculated under the condition that the difference in positions (angles) is zero, and the sum of forces is zero (equal forces are output in opposite directions) between inputs of the position (angle) of a member moved by the actuator 12 as well as the force calculated from the position (angle), and reference values which serve as reference for control of position (angle) and force.

In this case, in the actual operation transmission control, the reference values which serve as reference for control of position (angle) and force are the position (angle) of a member moved by the actuator 22 in the second drive device 20, and the force calculated from the position (angle).

In the data transmission control, when the operation of the first drive device 10 is controlled by provision data, the reference values which serve as reference for control of position (angle) and force are provision data which is obtained from the client system 40 for controlling the operation of the first drive device 10. Note that in the data transmission control, when the operation of the first drive device 10 is controlled by the provision data, the second drive device 20 does not perform any operation.

Similarly, in the present embodiment, here, when the position (angle) and the force output by the second drive device 20 are controlled, a state value in the space after a coordinate transformation can be calculated under the condition that the difference in positions (angles) is zero, and the sum of forces is zero (equal forces are output in opposite directions) between inputs of the position (angle) of a member moved by the actuator 22 as well as the force calculated from the position (angle), and reference values which serve as reference for control of position (angle) and force.

In this case, in the actual operation transmission control, the reference values which serve as reference for control of position (angle) and force are the position (angle) of a member moved by the actuator 12 in the first drive device 10, and force calculated from the position (angle).

In the data transmission control, when the operation of the second drive device 20 is controlled by provision data, the reference values which serve as reference for control of position (angle) and force are provision data which is obtained from the client system 40 for controlling the operation of the second drive device 20. Note that in the data transmission control, when the operation of the second drive device 20 is controlled by the provision data, the first drive device 10 does not perform any operation.

The ideal force source block FC is a block that performs calculation in a region of force in accordance with the coordinate transformation defined by the functional force velocity assignment transformation block FT. In the ideal force source block FC, a target value related to force is set for calculation performed based on the coordinate transformation defined by the functional force velocity assignment transformation block FT. The target value is set as a fixed value or a variable value according to the function to be implemented. For example, when a function similar to the function indicated by a reference value is implemented, zero is set as a target value, and when scaling is performed, an enlarged or reduced value of information indicating the function represented by a reference value can be set. The ideal force source block FC can set an upper limit value for the energy of force, determined by calculation in a region of force. Setting an upper limit value for the energy of force imposes restrictions on a contact force when the second mechanism 25 comes into contact with an object, thus damage to the second mechanism 25 and the object due to excessively strong pressing of the second mechanism 25 against the object can be prevented.

The ideal velocity (position) source block PC is a block that performs calculation in a region of position (angle) in accordance with the coordinate transformation defined by the functional force velocity assignment transformation block FT. In the ideal velocity (position) source block PC, a target value related to position (angle) is set for calculation performed based on the coordinate transformation defined by the functional force velocity assignment transformation block FT. The target value is set as a fixed value or a variable value according to the function to be implemented. For example, when a function similar to the function indicated by a reference value is implemented, zero is set as a target value, and when scaling is performed, an enlarged or reduced value of information indicating the function to be controlled can be set. The ideal velocity (position) source block PC can set an upper limit value for the energy of position (angle), determined by calculation in a region of position (angle). Setting an upper limit value for the energy of position (angle) imposes restrictions on the distance of movement of the second mechanism 25, thus damage to the second mechanism 25 and the object due to excessive movement of the second mechanism 25 can be prevented.

The reverse transformation block IFT is a block that reversely transforms the value of a region of position (angle) and force into the value (e.g., a voltage value or a current value) of a region input to the control target system CS (in other words, determines a command value in the actual space).

Under such a control algorithm, when the actual operation transmission control is performed, the detection values of position (angle) in time series detected by the position sensor 13 and the position sensor 23 are input to the force tactile sensation controller 311. The detection values of position (angle) in time series indicate the operation of the actuator 12 and the actuator 22, and the force tactile sensation controller 311 applies a coordinate transformation for force tactile sensation transmission to the input positions (angles) and a force derived from these positions (angles).

Under such a control algorithm, when the data transmission control is performed, the detection values of position (angle) in time series detected by the position sensor 23 (or the position sensor 13) are input to the force tactile sensation controller 311. The detection values of position (angle) in time series indicate the operation of the actuator 22 (or the actuator 12). In addition, the values of position (angle) in time series in the provision data are input to the force tactile sensation controller 311. The values of position (angle) in time series indicate the operation of the actuator 22 (or the actuator 12 in the provision data) in the provision data. The force tactile sensation controller 311 applies a coordinate transformation for force tactile sensation transmission to the input positions (angles) and a force derived from these positions (angles).

Note that in this case, the values of time-series data of the control parameter for position (angle) and force may be input as the provision data. In this case, the force tactile sensation controller 311 applies a coordinate transformation for force tactile sensation transmission based on the values of time-series data of the control parameters for position (angle) and force in the provision data, the positions (angles) input from the position sensor 23 and a force derived from the positions (angles).

Returning to FIG. 7, the operational data acquisition unit 312 acquires, as operational data (here, the raw data for operational data in functional coordinates), the time-series control parameters (here, the time-series control parameters for position (angle) and force, calculated to transmit force tactile sensation to the first drive device 10 and the second drive device 20) used by the force tactile sensation controller 311 to transmit force tactile sensation by the above-described control algorithm. The operational data acquisition unit 312 uploads the acquired operational data by transmitting it to the operational data management device 40. Furthermore, the operational data acquisition unit 312 stores the acquired operational data in the operational data storage unit 321. In other words, the operational data storage unit 321 serves as a storage unit to store operational data.

Note that the upload of operational data by transmission thereof by the operational data acquisition unit 312 may be performed at each time of sampling by the position sensor 13 and the position sensor 23, and calculation of a control parameter accompanying the sampling, or the time-series control parameters may be stored in the operational data storage unit 321 at each time of sampling and calculation of a control parameter, and may be collectively uploaded at a timing when the operation is completed.

After the upload of the operational data, the operational data acquisition unit 312 may secure the free space of the storage capacity of the operational data storage unit 321 by deleting the operational data stored in the operational data storage unit 321.

Note that the operational data acquisition unit 312 adds supplemental information to the acquired operational data as necessary, then transmits and stores the operational data, the supplemental information including identifiers to identify the first drive device 10 and the second drive device 20, attributes (e.g., the type, number of axes, movable range, torque output range, and sampling cycle of each device) of the first drive device 10 and the second drive device 20, the execution date and time of an operation, information on the operation content of an operation, and information on an object contacted in an operation. Thus, for example, in the operational data management device 40, these pieces of information can be utilized in tagging and normalization, and time-consuming input operation by a user for these pieces of information can be saved in the operational data management device 40.

The provision data acquisition unit 313 receives and acquires the provision data transmitted at the time of provision from the operational data management device 40. In short, the provision data acquisition unit 313 downloads the provision data. As described above, the provision data is the operational data in functional coordinates, which serves as a reference value for controlling the operation of the actuator 22 of the second drive device 20 (or the actuator 12 of the first drive device 10) in the data transmission control. As described above too, the provision data is converted to robot coordinates, and utilized. Thus, the provision data acquisition unit 313 converts the acquired provision data to robot coordinates, and stores the converted data in the provision data storage unit 322. In other words, the provision data storage unit 322 serves as a storage unit to store provision data. Note that the conversion to the robot coordinates may be performed in real time at the time of data transmission control instead of at the time of storing data in the provision data storage unit 322 as mentioned above.

Figure 9:
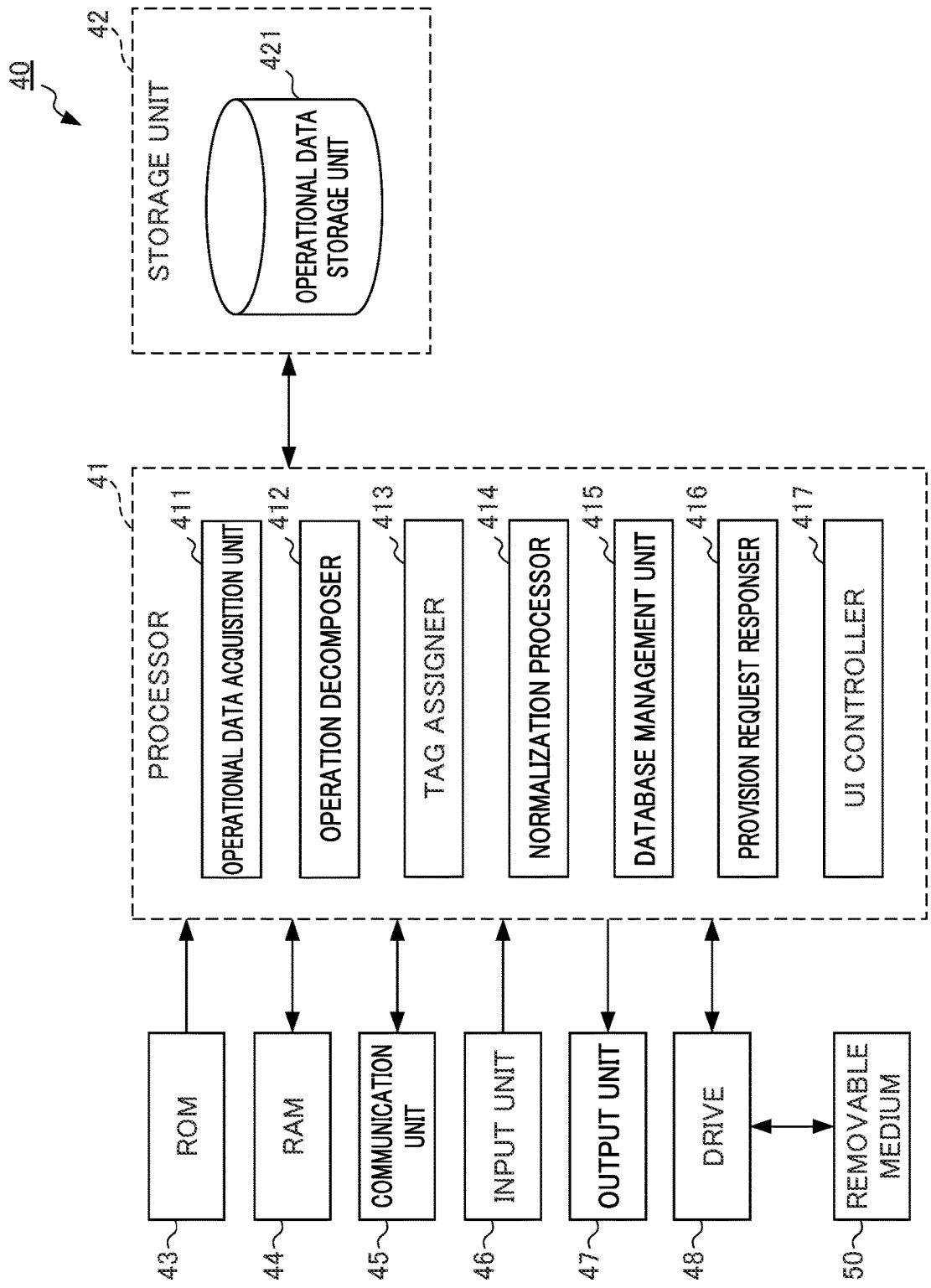
FIG. 9 is a block diagram showing the hardware configuration and the functional configuration of the operational data management device 40.

FIG. 9 is a block diagram showing the hardware configuration and the functional configuration of the operational data management device 40. As shown in FIG. 9, the operational data management device 40 includes a processor 41, a storage unit 42, a ROM 43, a RAM 44, a communication unit 45, an input unit 46, an output unit 47, and a drive 48.

Each of the processor 41, the storage unit 42, the ROM 43, the RAM 44, the communication unit 45 is the same as corresponding hardware with the same name included in the control device 30, thus a redundant repeated description is omitted. Each of those, and the input unit 46, the output unit 47, and the drive 48 are connected via a bus which is not illustrated The input unit 46 is comprised of various buttons, and receives various information in response to an instruction operation.

The output unit 47 is comprised of a display and a speaker, and outputs images and sound.

On the drive 48, a removable medium 50 is mounted as appropriate, which includes a magnetic disk, an optical disk, a magneto-optical disk, or a semiconductor memory. A program read from the removable medium 50 by the drive 48 is installed in the storage unit 42 as necessary.

When various processes described with reference to FIG. 2 to FIG. 5 are performed, an operational data acquisition unit 411, an operation decomposer 412, a tag assigner 413, a normalization processor 414, a database management unit 415, a provision request responser 416, and a UI controller 417 function in the processor 41. An operational data database 421 is formed in the storage unit 42.

In also a case not particularly mentioned below, data necessary to implement a process is transmitted and received between these functional blocks at an appropriate timing as needed.

The operational data acquisition unit 411 receives and acquires the operational data (here, the raw data for operational data in functional coordinates) uploaded by transmission from the operational data acquisition unit 312 of the control device 30. The operational data acquisition unit 411 stores the acquired operational data in the operational data database 421.

Besides this, the operational data database 421 stores various operational data along with processing by other functional blocks different from the operational data acquisition unit 411. For example, in the operational data accumulation process which has been described with reference to FIG. 2, the operational data database 421 stores the operational data in generalized coordinates, which has been normalized after the decomposition or tagging. For example, in the operational data generation process which has been described with reference to FIG. 5, the operational data database 421 stores generated operational data in generalized coordinates. Furthermore, for example, in the operational data provision process which has been described with reference to FIG. 5, the operational data database 421 stores denormalized operational data in functional coordinates. In other words, the operational data database 421 serves as a database to store and accumulate various operational data.

Note that when unnecessary operational data is generated in the functional blocks along with processing, the free space of the storage capacity of the operational data database 421 may be secured by deleting the unnecessary operational data stored in the operational data database 421. For example, when operational data in generalized coordinates is generated by performing normalization, the raw data for the operational data in functional coordinates before the normalization may be deleted. Alternatively, when provision data in functional coordinates is generated by performing denormalization, the provision data already provided to the local system may be deleted.

The free space of the storage capacity of the operational data database 421 may be secured by performing data compression using a general data compression technique instead of performing deletion. In this case, for example, based on a user-defined reference for the degree of importance of operational data, whether data is deleted or data compression is performed may be determined, and whether the data compaction method uses lossless compression or lossy compression may be determined.

The operation decomposer 412 decomposes the uploaded operational data acquired by the operational data acquisition unit 411 based on the operation content implemented by the operational data. For example, the operation decomposer 412 decomposes the operational data for each type (in other words, for each function) of the operation content. For example, when a plurality of functions are implemented by single operational data uploaded, the operational data is decomposed for each function resulting in a plurality of pieces of operational data. Note that when one function is implemented by single operational data uploaded, no decomposition is performed.

In order to perform decomposition and the later-described tagging, functions need to be predefined. In this case, a user can define any level of abstraction according to the environment in which the operational data management system S is installed and the application of the user. For example, a function may be defined by a level of abstraction such as "gripping", "transporting", "placing", or "processing". Alternatively, a function may be defined more specifically by lowering the level of abstraction. For example, instead of defining a function as "transporting", a function may be defined by subdividing "transporting" into "transporting at a high speed", "transporting at a medium speed", and "transporting at a low speed". Alternatively, a function may be defined from another point of view, such as "transporting a heavy load", "transporting a light load", or defined by further subdividing "transporting" by combining these points of view.

Note that the higher the level of abstraction, the larger the number of operational data included in a search result, and the lower the level of abstraction, the smaller the number of operational data included in a search result. Therefore, a user should define a function by a level of abstraction which does not produce too many search results or too few search results.

The tag assigner 413 assigns, as identification information, information on operation content to each piece of operational data decomposed by the operation decomposer 412. For example, the tag assigner 413 performs tagging by assigning the name of the type (in other words, the function) of operation content to the operational data as a tag serving as identification information. In this case, the name of a function assigned is defined by a user with the same reference as for the operation decomposer 412.

In addition, a tag other than the name of a function may be assigned as a tag. For example, a tag such as the category to which operation content belongs or the characteristic of operation content may be further assigned. As a category to which operation content belongs, for example, to the operational data whose function is "turning", "milling", or "drilling", the name of a category called "cutting machining", which is a category to which these functions belong, may be further assigned as a tag. Besides, as a tag such as the characteristic of operation content, for example, the name of characteristic such as "low frequency", "high frequency", "low degree of freedom", "high degree of freedom" may be assigned a tag.

In either case, it is preferable to assign a tag which allows a search user to intuitively understand that what kind of content is indicated by the tag because the convenience at the time of search by the user is improved.

Note that the decomposition by the operation decomposer 412 and the tagging by the tag assigner 413 may be manually executed based on an instruction operation by a user, or may be automatically executed by a classifier or AI produced by machine learning or rule base.

In this case, the classifier or AI can be generated, for example, by creating teaching data to which correct answers (e.g., the names of functions which are correct answers) are assigned as labels by a user in advance, and performing machine learning based on the teaching data. Alternatively, the classifier or AI can be generated, for example, by analyzing operational data by a user in advance and setting parameters such as thresholds based on the analysis result. Note that in this case, functions are defined not only by a user in advance, but also the classifier or AI may cause a computer to define functions automatically or semiautomatically based on the result of machine learning.

The normalization processor 414 normalizes or denormalizes operational data based on the operational data.

Specifically, the normalization processor 414 normalizes operational data in functional coordinates, thereby converting it to operational data in generalized coordinates. The normalization can be performed, for example, based on the attributes of a target device (e.g., the second drive device 20) to which force tactile sensation is transmitted through operational data, in the local system at the upload source of the operational data in functional coordinates.

In addition, the normalization processor 414 denormalizes operational data in generalized coordinates, thereby converting it to operational data in functional coordinates. The denormalization can be performed, for example, based on the attributes of a target device (e.g., the second drive device 20) to which force tactile sensation is transmitted through operational data, in the local system at the download destination of the operational data in functional coordinates.

As described above, the attributes of a device refer to e.g., the type, number of axes, movable range, torque output range, and sampling cycle of the device.

As a technique to implement normalization and denormalization by the normalization processor 414, an existing technique related to implementation of normalization and denormalization, such as min-max scale conversion, variance scale conversion, or scale conversion using a quantile may be used. Note that a different technique may be used for each control parameter, for example, when the value of a position (angle) control parameter is normalized or denormalized, a first technique is used, and when the value of a force control parameter is normalized or denormalized, a second technique is used. In this case, as a minimum value and a maximum value used for normalization and denormalization, for example, a minimum value and a maximum value based on the above-mentioned attributes of the device, or a minimum value and a maximum value of the control parameter value in the operational data may be used.

The operational data in functional coordinates in one local system is obtained and normalized by the normalization by the normalization processor 414, thus operational data in generalized coordinates, that is general-purpose operational data can be generated. When the operational data in generalized coordinates, that is general-purpose operational data is provided as provision data, denormalization of the provision data by the normalization processor 414 can provide operational data in functional coordinates corresponding to the device in the local system at the provision destination.

In other words, normalization and denormalization performed in this manner by the normalization processor 414 makes it possible to cancel the difference in respective attributes of a variety of devices and easily generate operational data corresponding to each of the variety of devices. Accordingly, human labor to prepare operational data according to each of the variety of devices can be saved. In addition, management of the operational data can be facilitated.

The database management unit 415 manages the operational data stored in the operational data database 421. For example, the database management unit 415 implements, based on the operational data, search in the operational data search process described above with reference to FIG. 3, browsing in the operational data browsing process described above with reference to FIG. 4, and generation of operational data in the operational data generation process described above with reference to FIG. 5.

Specifically, in the operational data search process, upon receiving an input of a file name or a selection of a tag, the database management unit 415 searches the operational data database using the file name or the tag as a search key, thereby retrieving the operational data as the search target. In addition, the database management unit 415 performs filtering by excluding, from the search target, the operational data not applicable to the attributes of the local system at the provision destination of the retrieved operational data. The attributes of the local system refer to the attributes of at least one of the first drive device 10, the second drive device 20, and the control device 30 in the local system. For example, when the number of axes of the second drive device 20 in the local system is four, the operational data which corresponds to an operation with five axes or more and is unable to be implemented with four axes is filtered. Besides, filtering may be performed by the attributes of a target contact object to be in contact with the second drive device 20 in the local system.

In the operational data browsing process, the database management unit 415 visualizes the operational data retrieved by the operational data search process, and displays the operational data to a user. The display can be implemented, for example, by converting the change in the time series of control parameters in the operational data to a graph format in which the horizontal axis indicates time and the vertical axis indicates the value (e.g., the value of a force control parameter, and the value of a position (velocity) control parameter) of control parameters, and displaying the graph on a display included in the output unit 47.

Besides, the display can be implemented by displaying a simulation result of an operation implemented by the operational data. The simulation is made by performing, for example, data transmission control based on the operational data on the virtual second drive device 20 (or the first drive device 10) in a virtual space implemented by arithmetic processing of a computer. In this case, the database management unit 415 makes a simulation by a virtual device in a general structure corresponding to tags for the operational data. For example, when the function assigned a tag is "gripping", a simulation is made by a virtual device in a general structure including a gripping mechanism set by default for the "gripping". Alternatively, the database management unit 415 may make a simulation by a user-specified virtual device with a general structure instead of a virtual device set by default. For example, a simulation may be made by a virtual device in a general structure with a similar degree of freedom to that of the device with which a user is assumed to utilize the operational data.

The display of the simulation result can be implemented, for example, by representing the operation of the virtual second drive device 20 (or the first drive device 10) using patterned computer graphics, and displaying what is represented on a display included in the output unit 47. This allows a user to intuitively grasp the operation implemented by the operational data. Note that in this case, the virtual second mechanism 25 (or the virtual first mechanism 15), and a virtual object to be in contact with may be represented using patterned computer graphics, and what is represented may be included in the display. Note that it is assumed that a simulation is made by a virtual device with a general structure so that a user can intuitively grasp the operation. However, when the operation implemented by the operational data is a special operation, a simulation may be made by a virtual device including a special structure corresponding to the special operation.

Furthermore, in the operational data generation process, along with the above-described search by the operational data search process and the display by the operational data browsing process, the database management unit 415 links a plurality of pieces of operational data selected by a user in the order set by the user, thereby generating single operational data including the plurality of pieces of operational data as the components. In this case, the value of control parameter around a linkage portion of the pieces of operational data to be linked may be adjusted, or operational data for interpolation may be separately inserted between the pieces of operational data to be linked so that the operation at the linkage portion becomes smooth (in other words, so that steep change in the control parameter at the linkage portion is eliminated).

Furthermore, the database management unit 415 may not only link a plurality of pieces of data, but also adjust the control parameters in the operational data, and generate operational data in the rule base that changes according to a transition condition.

When the control parameters in the operational data are adjusted, the database management unit 415 directly adjusts, for example, the values of the position (angle) and force control parameters based on an instruction operation by a user. Alternatively, when a user selects a reference such as "shorter time", or "longer time", the database management unit 415 automatically adjusts the value of a control parameter to generate operational data in compliance with the reference. For example, suppose that operational data corresponds to a function called "polishing" by which a work with its position fixed is polished by a robot arm equipped with a grinding tool. In this case, when a user selects the "shorter time", the database management unit 415 automatically adjusts the value of the position (angle) control parameter in the operational data to improve the operational velocity so that the polishing is completed in a shorter time. When such an automatic adjustment is made, an adjustment range (in other words, a degree of adjustment) is verified in advance and set. For example, driving the actual device while adjusting the control parameters, and causing a virtual device to make a simulation as verification are repeated, and setting is performed so that automatic adjustment is made appropriately based on the verification result. In this manner, the values of the control parameters can be appropriately adjusted by automatic adjustment.

The adjustment of the control parameters in the operational data may include not only adjusting part of the existing operational data in this manner, but also generating new operational data by adjusting the control parameters. For example, when a user wants to implement a desired function in the actual device, new operational data to implement the desired function may be generated. In this case, the new operational data to be generated may include predetermined regularity to implement the function by a predetermined pattern such as "moving at a constant velocity", "outputting force with the waveform of sine wave".

When operational data in the rule base that changes according to a transition condition is generated, the database management unit 415 adds, for example, the transition condition to the operational data generated by linkage. For example, a transition condition is added to the operational data generated by linking "operational data corresponding to the first function", "operational data corresponding to the second function", and "operational data corresponding to the third function", the transition condition being "when the operational data corresponding to the first function succeeds, the operational data corresponding to the second function is executed, whereas when the operational data corresponding to the first function fails, operations corresponding to the operational data of other functions are not executed". Alternatively, a transition condition is added, that is, "when the operational data corresponding to the first function succeeds, the operational data corresponding to the second function is executed and completed, whereas when the operational data corresponding to the first function fails, instead of the operational data corresponding to the second function, the operational data corresponding to the third function is executed and completed". The control device 30 provided with the operational data performs data transmission control using the operational data as the provision data, and determines whether the operation corresponding to the operational data of the first function has succeeded, based on the change in the position detected in real time by the position sensor 23 (or the position sensor 13), and the change in the force calculated from the position (angle). The data transmission control is then performed based on the determination result and the transition condition. In this manner, operational transition according to the transition condition can be implemented.

Note that instead of adjusting (also includes generation of new operational data) of these control parameters, and generating operational data in the rule base by the database management unit 415, the operational data acquisition unit 411 may obtain, from other devices, operational data with control parameters already adjusted, new generated operational data, and the operational data in the rule base.

In response to an instruction operation related to a request for provision from a user, the provision request responser 416 provides operational data to the control device 30 of the local system specified by the user. To select from the provided operational data, the database management unit 415 performs the above-mentioned search for operational data and browsing of operational data. The provision request responser 416 finally transmits and downloads the user-selected operational data to the control device 30 of the local system specified by the user, thereby implementing provision of the operational data.

The UI controller 417 performs control related to a user interface to display various information to a user, and receive various instruction operations from a user. For example, concurrently with execution of processing such as searching and browsing by each functional block, the UI controller 417 generates a user interface screen to perform searching and browsing, and displays the generated user interface screen on a display included in the output unit 47. In addition, the UI controller 417 receives an instruction operation from a user who has viewed the user interface screen, and outputs the content of the instruction operation to a corresponding functional block.

Next, the details of the content of each process performed by the operational data management system S will be described.

Operational Data Accumulation Process

Figure 10:
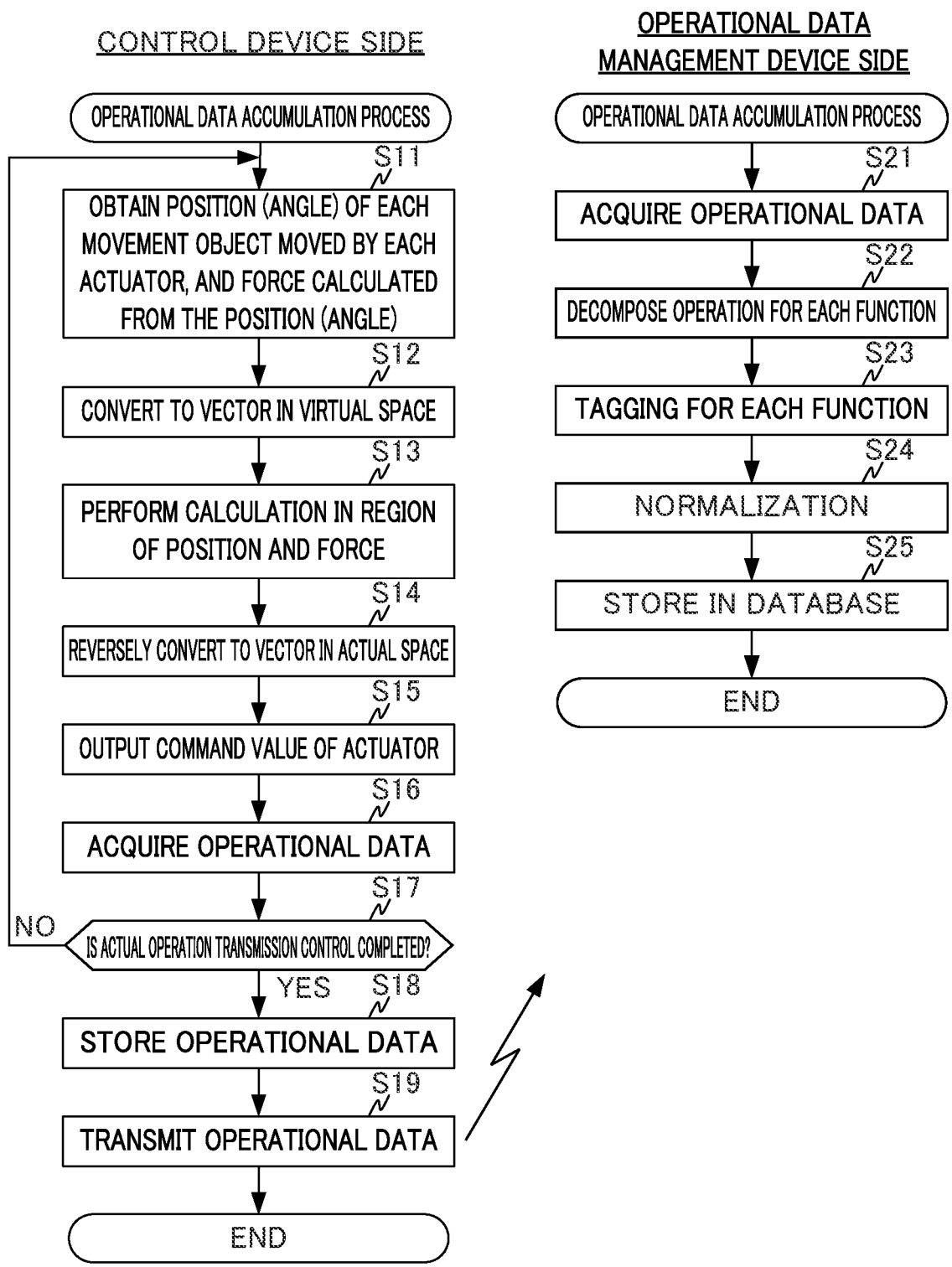
FIG. 10 is a flowchart illustrating the flow of an operational data accumulation process executed by the operational data management system S.

FIG. 10 is a flowchart illustrating the flow of an operational data accumulation process executed by the operational data management system S. The operational data accumulation process is executed upon starting the actual operation transmission control by the control device 30 in response to an operation on the first drive device 10 by a user, and upon receiving subsequently, by the control device 30, a start instruction operation by the user for the operational data accumulation process.

First, the process content of the control device 30 will be described.

In step S11, the force tactile sensation controller 311 obtains the position (specifically, the position or angle) of a movement object moved by the actuator 12 and the force calculated from the position (angle), and the position (specifically, the position or angle) of a movement object moved by the actuator 22 and the force calculated from the position (angle).

In step S12, the force tactile sensation controller 311 converts an input vector in an actual space to a vector in a virtual space.

In step S13, the force tactile sensation controller 311 performs calculation in a region of velocity (position) and calculation in a region of force.

In step S14, the force tactile sensation controller 311 reversely converts the value of a region of velocity (position) and force to the value (vector in an actual space) of a region of input to the control target system CS.

In step S15, the force tactile sensation controller 311 outputs command values of the actuator 12 and the actuator 22.

In step S16, the operational data acquisition unit 312 obtains, as the operational data (here, the raw data for operational data in functional coordinates), the time-series control parameters (here, the time-series control parameters for position (angle) and force calculated to transmit force tactile sensation to the first drive device 10 and the second drive device 20) used to transmit force tactile sensation in the processes (that is, the actual operation transmission control) in step S10 to step S15 performed by the force tactile sensation controller 311.

In step S17, upon completion of an operation on the first drive device 10 by a user, the operational data acquisition unit 312 determines whether the actual operation transmission control by the force tactile sensation controller 311 has been completed. When the actual operation transmission control has been completed, determination of YES is made in step S17, and the process proceeds to step S18. Meanwhile, when the actual operation transmission control has not been completed, determination of NO is made in step S17, and the process returns to step S11 and is repeated.

In step S18, the operational data acquisition unit 312 stores the operational data acquired in step S16 in the operational data storage unit 321.

In step S19, the operational data acquisition unit 312 transmits the operational data acquired in step S16 to the operational data management device 40. Thus, the operational data accumulation process in the control device 30 is completed.

Note that in the present flowchart, each time step S16 is repeated, the operational data is temporarily stored, and in step S18 and step S19, the temporarily stored operational data is all collectively transmitted and stored. Without being limited to this, each time step S16 is repeated, storing and transmission similar to those in step S18 and step S19 may be performed.

Next, the process content of the operational data management device 40 will be described.

In step 321, the operational data acquisition unit 411 receives and acquires the operational data (here, the raw data for operational data in functional coordinates) uploaded by transmission from the operational data acquisition unit 312 of the control device 30.

In step S22, the operation decomposer 412 decomposes the operational data acquired in step S21 based on the operation content implemented by the operational data.

In step S23, the tag assigner 413 performs tagging by assigning, as identification information, information on the operation content to each piece of operational data decomposed in step S22.

In step S24, the normalization processor 414 normalizes the operational data based on the operational data which has been tagged in step S23.

In step S25, the normalization processor 414 stores the operational data after being normalized in step S24 in the operational data database by placing the operational data in the operational data database 421. Thus, the operational data accumulation process in the operational data management device 40 is completed.

The operational data accumulation process described above allows the operational data to be accumulated as if it is content by performing tagging and normalization.

Operational Data Provision Process

Figure 11:
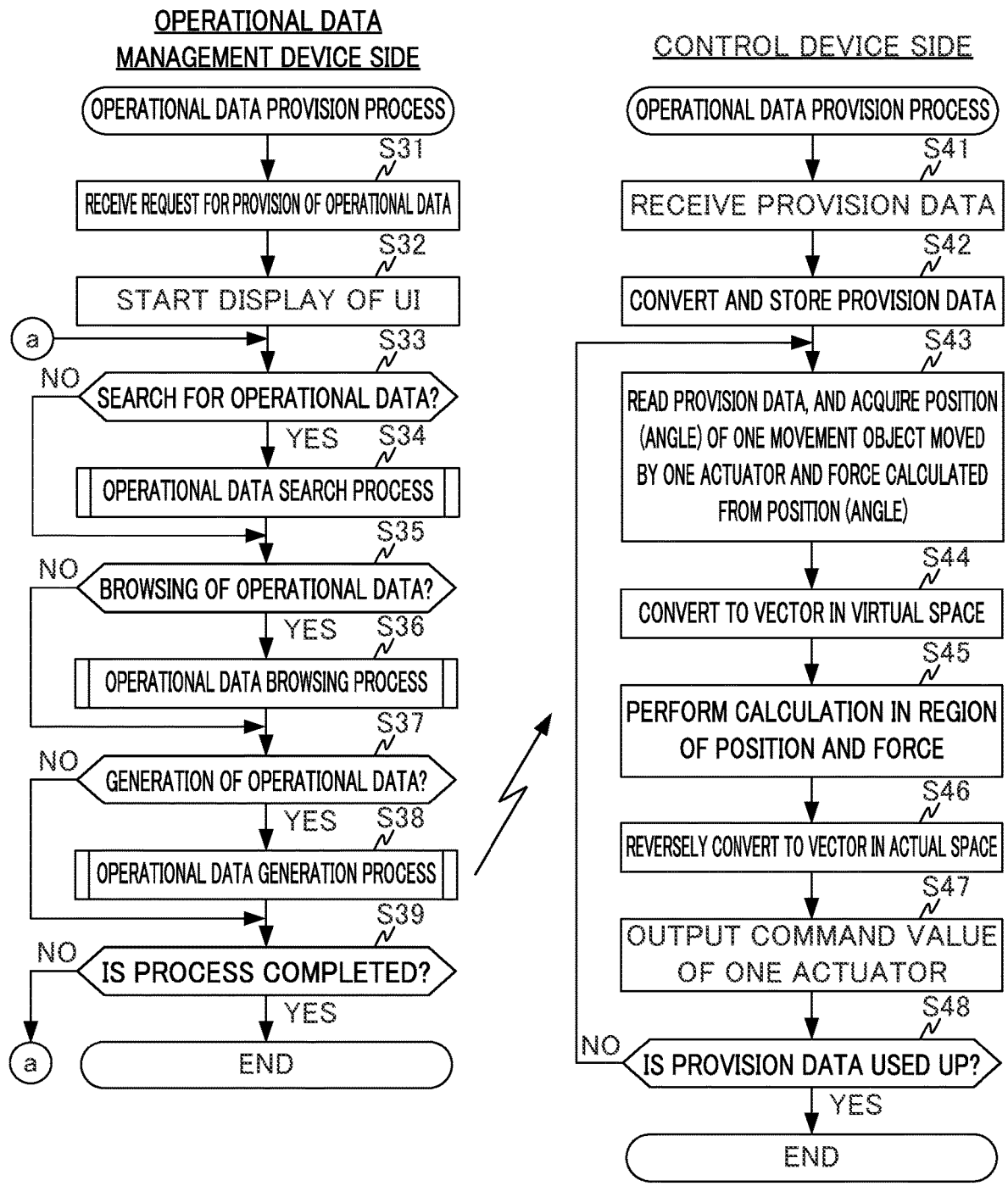
FIG. 11 is a flowchart illustrating the flow of an operational data provision process executed by the operational data management system S.

FIG. 11 is a flowchart illustrating the flow of an operational data provision process executed by the operational data management system S. The operational data provision process is executed upon receiving, by the operational data management device 40, a start instruction operation by a user for the operational data provision process.

First, the process content of the operational data management device 40 will be described.

In step 531, the provision request responser 416 receives an instruction operation from a user for a request for provision of operational data.

In step S32, the UI controller 417 starts to display a user interface screen to display various information to a user, and receive various instruction operations from a user. Hereinafter, the UI controller 417 makes a transition of the user interface screen as appropriate according to the situation. For example, when search is performed, a transition is made to the user interface screen for search.

In step S33, the UI controller 417 determines whether an instruction operation to start search for operational data has been received. When an instruction operation to start search has been received, determination of YES is made in step S33, and the process proceeds to step S34. Meanwhile, when an instruction operation to start search has not been received, determination of NO is made in step S33, and the process proceeds to step S35.

In step S34, the database management unit 415 performs the operational data search process as a subroutine. The details of the operational data search process will be described below with reference to FIG. 12.

In step S35, the UI controller 417 determines whether an instruction operation to start browsing operational data has been received. When an instruction operation to start browsing has been received, determination of YES is made in step S35, and the process proceeds to step S36. Meanwhile, when an instruction operation to start browsing has not been received, determination of NO is made in step S35, and the process proceeds to step S37.

In step S36, the database management unit 415 performs the operational data browsing process as a subroutine. The details of the operational data browsing process will be described below with reference to FIG. 13.

In step S37, the UI controller 417 determines whether an instruction operation to start generation of operational data has been received. When an instruction operation to start generation has been received, determination of YES is made in step S37, and the process proceeds to step S38. Meanwhile, when an instruction operation to start generation has not been received, determination of NO is made in step S37, and the process proceeds to step S39.

In step S38, the database management unit 415 performs the operational data generation process as a subroutine. The details of the operational data generation process will be described below with reference to FIG. 14. Note that the operational data generated along with execution of the operational data generation process is provided to the control device 30 as provision data.

In step S39, the UI controller 417 determines whether the operational data provision process is to be completed. For example, when a completion instruction operation by a user for the operational data provision process is received, the operational data provision process is completed. When the operational data provision process is completed, determination of YES is made in step S39, and the present process is completed. Meanwhile, when the operational data provision process is not completed, determination of NO is made in step S39, and the process returns to step S33 and is repeated.

Next, the process content of the control device 30 will be described. In step S41, the provision data acquisition unit 313 receives and acquires provision data transmitted at the time of provision from the operational data management device 40. In short, the provision data acquisition unit 313 downloads the provision data.

In step S42, the provision data acquisition unit 313 converts the provision data acquired in step S41 to robot coordinates, and stores the converted data in the provision data storage unit 322.

In step S43, the force tactile sensation controller 311 reads the provision data to implement the data transmission control from the provision data storage unit 322, and obtains the position (specifically, the position or angle) of a movement object moved by the actuator (the actuator 12 or the actuator 22) of one of the drive devices, driven as a target for the data transmission control, and the force calculated from the position (angle).

In step S44, the force tactile sensation controller 311 converts an input vector in an actual space to a vector in a virtual space.

In step S45, the force tactile sensation controller 311 performs calculation in a region of velocity (position) and calculation in a region of force.

In step S46, the force tactile sensation controller 311 reversely converts the value of a region of velocity (position) and force to the value (vector in an actual space) of a region of input to the control target system CS.

In step S47, the force tactile sensation controller 311 outputs a command value of the actuator (the actuator 12 or the actuator 22) of one of the drive devices, which is driven as a target for the data transmission control. Note that in the implementation process, a command value of the actuator (here, the actuator 12 or the actuator 22) of the other of the drive devices is not output, where the other drive device is not a target for the data transmission control.

In step S48, the force tactile sensation controller 311 determines whether the provision data used for the data transmission control in the present process has been used up. When the provision data has been used up, determination of YES is made in step S48, and the present process is completed. Meanwhile, when the provision data has not been used up, determination of NO is made in step S48, and the process returns to step S43 and is repeated.

The operational data provision process described above can implement an operation corresponding to the operational data (here, the provision data) by providing the local system at the provision destination with operational data applicable to the local system.

Operational Data Search Process

Figure 12:
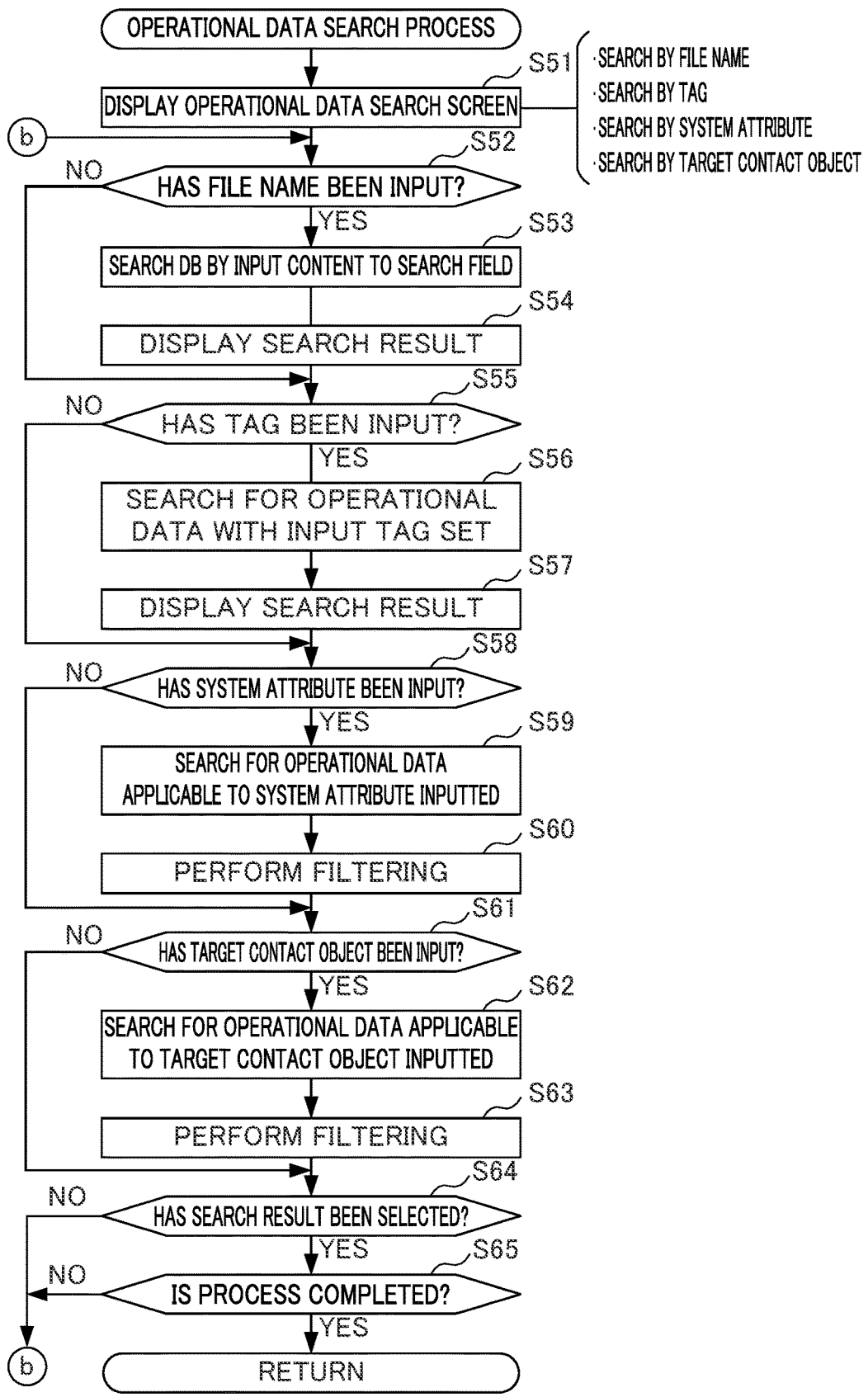
FIG. 12 is a flowchart illustrating the flow of an operational data search process executed by the operational data management system S.

FIG. 12 is a flowchart illustrating the flow of an operational data search process executed by the operational data management system S. The operational data search process is executed upon receiving, by the operational data management device 40, a start instruction operation by a user for the operational data search process in the course of the operational data provision process.

In step S51, the UI controller 417 displays an operational data search screen as a user interface screen. On the operational data search screen, search fields for a user are arranged, the search fields for performing an input instruction operation on, for example, "file name" to perform search by the file name of operational data, "tag" to perform search based on tag, "system attribute" to perform filtering by the attributes of a local system, and "target contact object" to perform filtering by the attributes of a target contact object.

In step S52, the UI controller 417 determines whether input of a file name to a search field has been received. When input of a file name to a search field has been received, determination of YES is made in step S52, and the process proceeds to step S53. Meanwhile, when input of a file name to a search field has not been received, determination of NO is made in step S52, and the process proceeds to step S55.

In step S53, the database management unit 415 searches the operational data database 421 using the file name input to the search field in step S52 as a search key, and retrieves operational data as the search target.

In step S54, the database management unit 415 displays the operational data retrieved in step S53 as the search result on the operational data search screen.

In step S55, the UI controller 417 determines whether input of a tag to a search field has been received. When input of a tag to a search field has been received, determination of YES is made in step S55, and the process proceeds to step S56. Meanwhile, when input of a tag to a search field has not been received, determination of NO is made in step S55, and the process proceeds to step S58.

In step S56, the database management unit 415 searches the operational data database 421 using the tag input to a search field in step S55 as a search key, and retrieves operational data as the search target.

In step S57, the database management unit 415 displays the operational data retrieved in step S56 as the search result on the operational data search screen.

In step S58, the UI controller 417 determines whether input of a system attribute to a search field has been received. As described above, the system attribute refers to the attribute of at least one of the first drive device 10, the second drive device 20, and the control device 30 in the local system at the provision destination of the retrieved operational data. When input of a system attribute to a search field has been received, determination of YES is made in step S58, and the process proceeds to step S59. Meanwhile, when input of a system attribute to a search field has not been received, determination of NO is made in step S58, and the process proceeds to step S61.

In step S59, the database management unit 415 searches the operational data database 421 using the system attribute input to a search field in step S58 as a search key, and retrieves operational data as the search target.

In step S60, the database management unit 415 sets the operational data retrieved in step S59 as the search target, and performs filtering by excluding other operational data from the search target. Thus, the operational data to be filtered in the present step is excluded from the search target in step S53 and step S56, and accordingly, is also excluded from the display target in step S54 and step S57.

In step S61, the UI controller 417 determines whether input of an attribute of a target contact object to a search field has been received. As described above, the attribute of a target contact object refers to the attribute of a target contact object to be in contact with the second drive device 20 in the local system at the provision destination of the retrieved operational data. When input of an attribute of a target contact object to a search field has been received, determination of YES is made in step S61, and the process proceeds to step S62. Meanwhile, when input of an attribute of a target contact object to a search field has not been received, determination of NO is made in step S61, and the process proceeds to step S64.

In step S62, the database management unit 415 searches the operational data database 421 using the attribute of a target contact object input to a search field in step S61 as a search key, and retrieves operational data as the search target.

In step 563, the database management unit 415 sets the operational data retrieved in step S62 as the search target, and performs filtering by excluding other operational data from the search target. Thus, the operational data to be filtered in the present step is excluded from the search target in step S53 and step S56, and accordingly, is also excluded from the display target in step S54 and step S57.

In step S64, the UI controller 417 determines whether operational data has been selected from the search result by a selection instruction operation of a user. When operational data has been selected, determination of YES is made in step S64, and the process proceeds to step S65. Meanwhile, when operational data has not been selected, determination of NO is made in step S64, and the process returns to step S52 and is repeated.

In step S65, the UI controller 417 determines whether the operational data search process is to be completed. For example, when a completion instruction operation by a user for the operational data search process is received, the operational data search process is completed. When the operational data search process is completed, determination of YES is made in step S65, and the operational data search process returns. In other words, step S34 in FIG. 11 is completed, and the process proceeds to step S35. Meanwhile, when the operational data search process is not completed, determination of NO is made in step S65, and the process returns to step S52 and is repeated.

The operational data search process described above can easily retrieve operational data desired by a user by performing the search utilizing a tag, and filtering.

Operational Data Browsing Process

Figure 13:
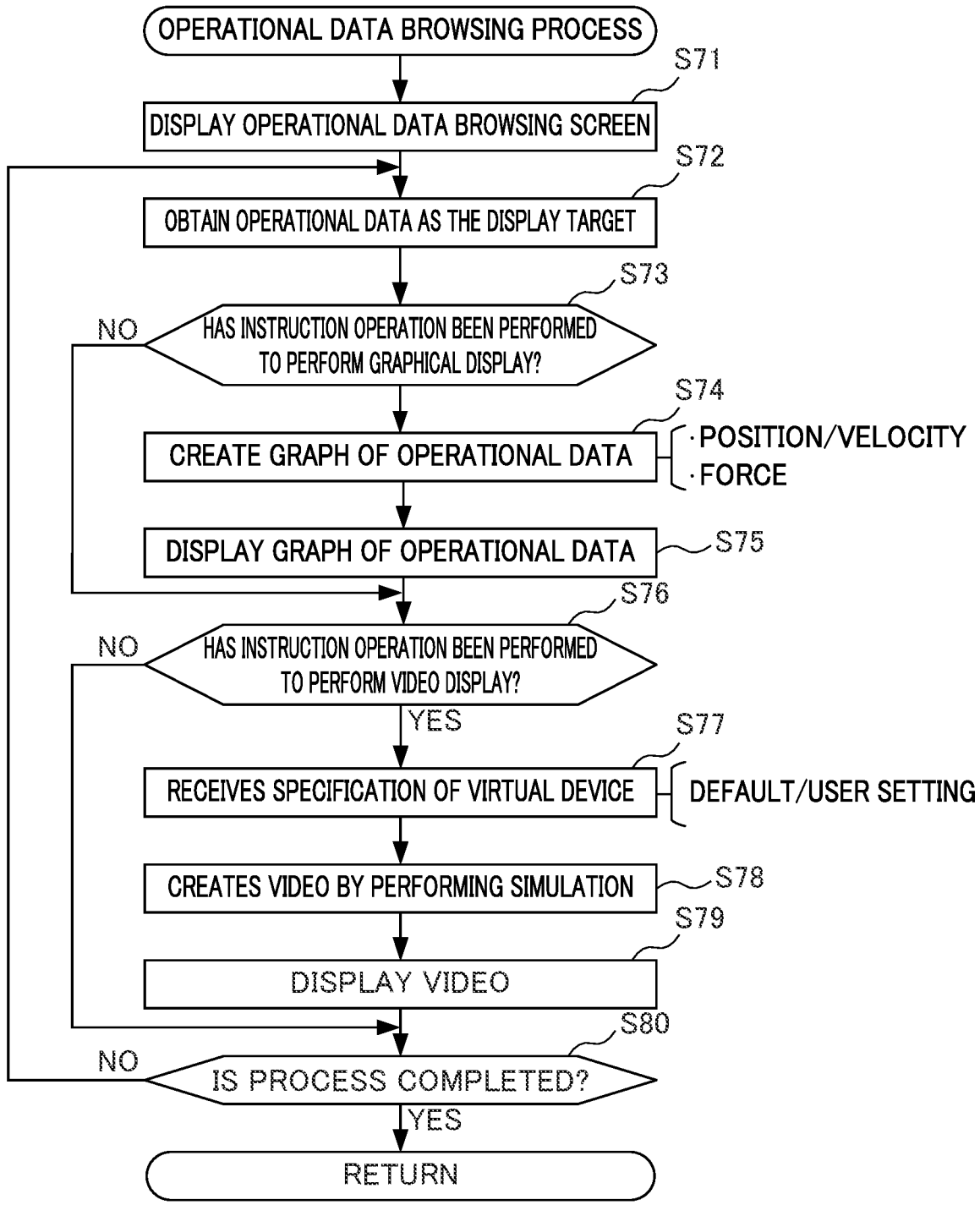
FIG. 13 is a flowchart illustrating the flow of an operational data browsing process executed by the operational data management system S.

FIG. 13 is a flowchart illustrating the flow of an operational data browsing process executed by the operational data management system S. The operational data browsing process is executed upon receiving, by the operational data management device 40, a start instruction operation by a user for the operational data browsing process in the course of the operational data provision process.

In step S71, the UI controller 417 displays an operational data browsing screen as a user interface screen. On the operational data browsing screen, a display region is arranged to display, for example, operational data converted to a graph format, and a simulation result of an operation implemented by operational data.

In step S72, the UI controller 417 obtains operational data as the display target based on a selection instruction operation of a user. In this case, a user selects operational data as the display target from the operational data included in the search result of the operational data search process.

In step S73, the UI controller 417 determines whether an instruction operation to perform graphical display of the operational data selected in step S72 has been received from a user. When an instruction operation to perform graphical display has been received, determination of YES is made in step S73, and the process proceeds to step S74. Meanwhile, when an instruction operation to perform graphical display has not been received, determination of NO is made in step S73, and the process proceeds to step S76.

In step S74, the database management unit 415 creates a graph by converting, to a graph format, the change in the time series of control parameters in the operational data selected in step S72. The graph is such that, for example, the horizontal axis indicates time, and the vertical axis indicates the value of a force control parameter, and the value of a position (velocity) control parameter.

In step S75, the graph created in step S74 is displayed.

In step S76, the UI controller 417 determines whether an instruction operation to perform video display of the operational data selected in step S72 has been received from a user. When an instruction operation to perform video display has been received, determination of YES is made in step S76, and the process proceeds to step S77. Meanwhile, when an instruction operation to perform video display has not been received, determination of NO is made in step S76, and the process proceeds to step S80.

In step S77, the UI controller 417 receives specification of a virtual device to perform a simulation by an instruction operation of a user. The virtual device may be the default one corresponding to the function implemented by the operational data, or may be specified by a user.

In step S78, the database management unit 415 creates a video by performing a simulation of the operation implemented by the operational data selected in step S72.

In step S79, the database management unit 415 displays the video created in step S78.

In step 380, the UI controller 417 determines whether the operational data browsing process is to be completed. For example, when a completion instruction operation by a user for the operational data browsing process has been received, the operational data browsing process is completed. When the operational data browsing process is completed, determination of YES is made in step S80, and the operational data browsing process returns. In other words, step S36 in FIG. 11 is completed, and the process proceeds to step S37. Meanwhile, when the operational data browsing process is not completed, determination of NO is made in step S80, and the process returns to step S72 and is repeated.

The operational data browsing process described above can display the operational data to support the search by a user in an intuitively graspable format for the user, such as operational data converted to a graph, and a video of the operation shown in a simulation by a virtual device.

Operational Data Generation Process

Figure 14:
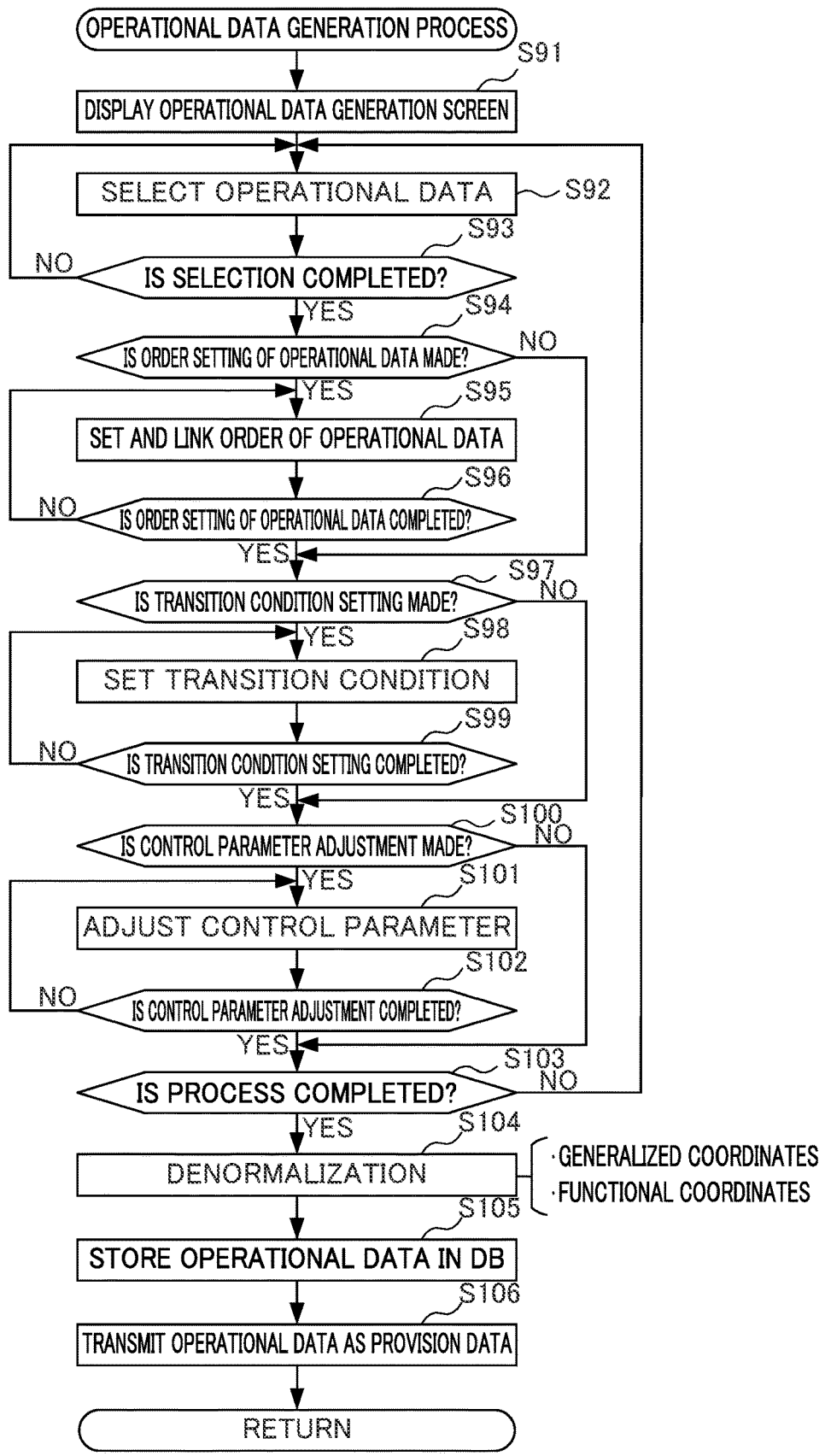
FIG. 14 is a flowchart illustrating the flow of an operational data generation process executed by the operational data management system S.

FIG. 14 is a flowchart illustrating the flow of an operational data generation process executed by the operational data management system S. The operational data generation process is executed upon receiving, by the operational data management device 40, a start instruction operation by a user for the operational data generation process in the course of the operational data provision process.

In step 591, the UI controller 417 displays an operational data generation screen as a user interface screen. On the operational data generation screen, operation buttons are arranged, for example, to select operational data to be generated, and perform parameter adjustment.

In step S92, the database management unit 415 selects operational data according to an instruction operation by a user to select operational data. The selected one or plurality of operational data provides the components of the operational data to be generated subsequently.

In step S93, the UI controller 417 determines whether an instruction operation by a user to select operational data has been completed. When an instruction operation to select operational data has been completed, determination of YES is made in step S93, and the process proceeds to step S94. Meanwhile, when an instruction operation to select operational data has not been completed, determination of NO is made in step S93, and the process returns to step S92 and is repeated.

In step S94, the UI controller 417 determines whether an instruction operation from a user to make order setting for the operational data selected in step S92 has been received. When an instruction operation to make order setting has been received, determination of YES is made in step S94, and the process proceeds to step S95. Meanwhile, when an instruction operation to make order setting has not been received, determination of NO is made in step S94, and the process proceeds to step S97. Note that even when only one piece of operational data is selected in step S92, determination of NO is made in step S94, and the process proceeds to step S97.

In step S95, the database management unit 415 sets the order of the plurality of pieces of operational data selected in step S92 according to an instruction operation by a user to make order setting, and links the plurality of pieces of operational data in the set order, thereby generating single operational data including the plurality of pieces of operational data as the components.

In step S96, the UI controller 417 determines whether an instruction operation by a user to make order setting has been completed. When an instruction operation to make order setting has been completed, determination of YES is made in step S96, and the process proceeds to step S97. Meanwhile, when an instruction operation to make order setting has not been completed, determination of NO is made in step S96, and the process returns to step S95 and is repeated.

In step S97, the UI controller 417 determines whether an instruction operation from a user to make transition condition setting for the operational data selected in step S92 has been received. When an instruction operation to make transition condition setting has been received, determination of YES is made in step S97, and the process proceeds to step S98. Meanwhile, when an instruction operation to make transition condition setting has not been received, determination of NO is made in step S97, and the process proceeds to step S100. Note that even when only one piece of operational data is selected in step S92, determination of NO is made in step S97, and the process proceeds to step S100.

In step S98, the database management unit 415 sets a transition condition for the plurality of pieces of operational data selected in step S92 according to an instruction operation by a user to make transition condition setting.

In step S99, the UI controller 417 determines whether an instruction operation by a user to make transition condition setting has been completed. When an instruction operation to make transition condition setting has been completed, determination of YES is made in step S99, and the process proceeds to step S100. Meanwhile, when an instruction operation to make transition condition setting has not been completed, determination of NO is made in step S99, and the process returns to step S98 and is repeated.

In step S100, the UI controller 417 determines whether an instruction operation from a user to adjust the control parameters for the operational data selected in step S92 has been received. When an instruction operation to adjust the control parameters has been received, determination of YES is made in step S100, and the process proceeds to step S101. Meanwhile, when an instruction operation to adjust the control parameters has not been received, determination of NO is made in step S100, and the process proceeds to step S103.

In step S101, the database management unit 415 adjusts the control parameters for the operational data selected in step S92 according to an instruction operation by a user to adjust the control parameters.

In step S102, the UI controller 417 determines whether an instruction operation by a user to make adjustment setting for the control parameters has been completed. When an instruction operation to make adjustment setting for the control parameters has been completed, determination of YES is made in step S102, and the process proceeds to step S103. Meanwhile, when an instruction operation to make adjustment setting for the control parameters has not been completed, determination of NO is made in step S102, and the process returns to step S101 and is repeated.

In step S103, the UI controller 417 determines whether the operational data generation process is to be completed. For example, when a completion instruction operation by a user for the operational data generation process is received, the operational data generation process is completed. When the operational data generation process is completed, determination of YES is made in step S103, and the process proceeds to step S104. Meanwhile, when the operational data generation process is not completed, determination of NO is made in step S103, and the process returns to step S92 and is repeated.

In step S104, the normalization processor 414 denormalizes the operational data selected in step S92, which has undergone linkage and setting of transition condition, and adjustment of the control parameters as necessary. Thus, operational data in functional coordinates is generated from the operational data in generalized coordinates.

In step S105, the database management unit 415 stores the operational data generated by the denormalization in step S104 in the operational data database 421.

In step S106, the provision request responser 416 transmits and downloads, as provision data, the operational data generated by the denormalization in step S104 to the control device 30 in the local system specified by a user, thereby implementing provision of the operational data.

Thus, the operational data provision process returns. In other words, step S38 in FIG. 11 is completed, and the process proceeds to step S39.

According to a selection of a user, the operational data generation process described above can generate single continuous pieces of operational data from a plurality of pieces of operational data, and convert to the operational data in functional coordinates corresponding to the local system that provides the operational data.

As described above, the operational data management system S assigns information on operation content to operational data as identification information by executing each process, and manages the operational data so that desired operational data is searchable by the identification information. Consequently, a user can perform search based on information (e.g., the function of an operation, and an operational condition) on operation content, that is, information easily grasped. In other words, the operational data management system S treats each of the pieces of operational data as a content, and manages the content as a library, thereby making it possible to improve the convenience of users and utilize the operational data.

Therefore, the operational data management system S can solve the problem, that is, to manage the data related to force tactile sensation more appropriately.

Modifications

Although the embodiment of the present invention has been described above, the embodiment is only for illustrative purposes, and does not limit the technical scope of the present invention. The present invention may include various other embodiments in a range not departing from the gist of the present invention, and various modifications such as omission and replacement may be made.

Modification 1

In the embodiment described above, the control device 30 and the operational data management device 40 are implemented as different devices. Without being limited to this, for example, the control device 30 and the operational data management device 40 may be implemented as an integrated device. In other words, a device may be implemented that obtains operational data by performing control to transmit force tactile sensation, and that can manage the operational data by itself.

Besides, for example, the three devices, that is, the first drive device 10, the second drive device 20, and the control device 30 may not necessarily be included in a set. For example, a set including only two devices, that is, the control device 30 and the second drive device 20 may be present.

In this case, the actual operation transmission control cannot be performed in the set including only the two devices. However, instead, the control device 30 in the set including only the two devices can control the second drive device 20 by performing the data transmission control based on the provision data provided from the operational data management device 40.

Besides, for example, a set may be present which includes one control device 30, a plurality of first drive devices 10 and a plurality of second drive devices 20. In such a set, for example, a plurality of first drive devices 10 operate as the master device for a multi-degree of freedom robot arm, and a plurality of second drive devices 20 operate as the slave device for a multi-degree of freedom robot arm, and all these operations are controlled by one control device 30.

Besides, for example, the control device 30 may be implemented as a device integrated with the first drive device 10 or the second drive device 20. Besides, for example, the operational data management device 40 may be implemented by a plurality of server devices that form a cloud server.

In other words, the system configuration in the above-described embodiment is only an example, and can be altered to various configurations as appropriate.

Modification 2

Allocation of devices that implement each functional block in the above-described embodiment may be changed. For example, the control device 30 is provided with an input unit and an output unit, and a user may perform a series of operations on the operational data management device 40 via the input unit and the output unit of the control device 30. Besides, for example, the control device 30 is provided with a denormalizer that performs denormalization. The operational data management device 40 may provide operational data in generalized coordinates to the control device 30 as provision data, and the control device 30 may denormalize the provision data to convert the provision data to operational data in functional coordinates.

Modification 3

A predetermined process may be added to the above-described embodiment. For example, in the operational data accumulation process, preprocessing for the purpose of noise reduction may be performed on the raw data for the operational data acquired by the operational data acquisition unit 312.

As the preprocessing, for example, a filter is used which allows only a predetermined frequency band to transmit, and causes other frequency bands to attenuate. In this case, for example, use of a low pass filter can remove the high-frequency noise components in the raw data for the operational data.

Besides, in the detection values of the parameters included in the raw data for operational data, a detection value exceeding a predetermined threshold may be neglected and replaced with an immediately preceding detection value, and outlier removal may be performed as the preprocessing. Besides, for example, in the detection values of the parameters included in the raw data for operational data, a detection value exceeding a predetermined threshold may be saturated and replaced with the threshold, and outlier saturation may be performed as the preprocessing.

Thus, the noise contained in the raw data for the operational data can be removed appropriately.

Modification 4

In the above-described embodiment, force tactile sensation is transmitted based on the control algorithm which has been described with reference to FIG. 8. In this case, as described above, the value of the position (angle) in time series detected in real time by the position sensor 23 (or the position sensor 13), and the value of a force calculated from the position (angle) serve as reference values in the control algorithm. Without being limited to this, in addition to the position sensor, a force sensor may be utilized.

In this case, each of the first drive device 10 and the second drive device 20 is provided with a force sensor in addition to the position sensor. Rather than the value of the force calculated from the value of the position (angle) in time series detected in real time by the position sensor, but the value of the force in time series detected in real time by the force sensor serves as a reference value in the control algorithm. Thus, for example, when a force sensor is provided which can detect the value of a force with high accuracy, force tactile sensation can also be transmitted utilizing the force sensor.

Modification 5

In the above-described embodiment, in the operational data search process, the UI controller 417 displays the operational data search screen as a user interface screen. A user who has viewed the screen searches for operational data by inputting a search key such as a file name or a tag. Without being limited to this, search for operational data may be performed by another method.

For example, the control device 30 in the local system may transmit, to the provision request responser 416, an operational data provision request including information, such as a tag corresponding to the operation content to be performed subsequently, and the system attribute of the local system of itself. The database management unit 415 then searches for operational data corresponding to the provision request, and may provide the operational data to the control device 30 as provision data. Consequently, the local system including the control device 30 can automatically obtain the operational data. Note that to enable the provision request from various local systems through a general-purpose request, a request for provision is preferably made e.g., via API (Application Programming Interface).

As described above, the operational data management system S according to the present embodiment includes the operational data acquisition unit 411, the tag assigner 413, and the database management unit 415.

The operational data acquisition unit 411 acquires, as operational data, the time-series control parameters used to transmit force tactile sensation between devices.

The tag assigner 413 assigns, as identification information, information related to the operation content implemented by the operational data to the operational data acquired by the operational data acquisition unit 411.

The database management unit 415 accumulates a plurality of pieces of operational data assigned identification information by the tag assigner 413, and manages the operational data so that desired operational data is searchable from the accumulated plurality of pieces of operational data based on the identification information.

In this manner, the operational data management system S assigns information on operation content as identification information, and manages the operational data so that desired operational data is searchable by the identification information. Consequently, a user can perform search based on information (e.g., the function of an operation, and an operational condition) on operation content, that is, information easily grasped. In other words, the operational data management system S treats each of the pieces of operational data as a content, and manages the content as a library, thereby making it possible to improve the convenience of users and utilize the operational data.

Therefore, the operational data management system S can solve the problem, that is, to manage the data related to force tactile sensation more appropriately.

The operational data management system S further includes the provision request responser 416, and the normalization processor 414. The provision request responser 416 provides the operational data retrieved based on identification information to the control device that performs control to transmit force tactile sensation.

The normalization processor 414 normalizes the operational data acquired by the operational data acquisition unit 411, based on the attributes of a target device to which force tactile sensation is transmitted through the operational data, and denormalizes the operational data provided by the provision request responser 416, based on the attributes of a target device to which force tactile sensation is transmitted through the operational data.

Thus, even when a device at the acquisition source of operational data, and a device that transmits force tactile sensation through provided operational data have different attributes, force tactile sensation can be transmitted through operational data regardless of the difference.

The provision request responser 416 links a plurality of pieces of operational data retrieved based on identification information, thereby providing, to the control device, single operational data including the plurality of pieces of operational data as the components.

Consequently, the control device can continuously transmit force tactile sensation of the plurality of pieces of operational data retrieved, thus can implement the plurality of operations as a series of operations.

The operational data management system S further includes the operation decomposer 412.

The operation decomposer 412 decomposes single continuous operational data acquired by the operational data acquisition unit 411 into multiple pieces of operational data according to a plurality of operation contents implemented by the operational data.

Thus, each of the continuous multiple operations can be managed as separate operational data.

The database management unit 415 excludes part of the accumulated plurality of pieces of operational data from the search target based on at least one of the attribute of a target device to which force tactile sensation is transmitted through the operational data retrieved according to identification information, the attribute of the control device that performs control to transmit force tactile sensation to the target device, and the attribute of a target contact object to be in contact with the target device in the operation of the target device.

Thus, for example, the operational data not applicable to the attributes of a target device to which force tactile sensation is transmitted, the control device, and a target contact object can be excluded (in other words, filtered) from the search target.

The database management unit 415 transmits force tactile sensation to a virtual device through the operational data retrieved based on identification information, thereby implementing the operation of the virtual device, and display of the implemented operation of the virtual device.

Thus, what kind of operations are implemented by the operational data can be displayed to a user using computer graphics, for example. This allows a user to intuitively grasp the operation implemented by the operational data.

When the actuator 12, the position sensor 13, the actuator 22, the position sensor 23, and the force tactile sensation controller 311 are present, the actuator 12 moves a first movement target upon execution of a predetermined operation.

The position sensor 13 obtains first position information on the position of the first movement target moved by the actuator 12.

The actuator 22 moves a second movement target upon execution of a predetermined operation.

The position sensor 23 obtains second position information on the position of the second movement target moved by the actuator 22.

The force tactile sensation controller 311 controls the actuator 12 so as to output the position and force corresponding to the operation indicated by the second position information based on the first position information, and the second position information which serves as a reference for the operation of the actuator 12 as well as controls the actuator 22 so as to output the position and force corresponding to the operation indicated by the first position information based on the second position information, and the first position information which serves as a reference for the operation of the actuator 22.

The operational data acquisition unit 411 obtains, as operational data, at least part of the time-series control parameters used by the force tactile sensation controller 311 to control the actuator 12 and the actuator 22.

Consequently, with a simple configuration to detect a position by the position sensor, it is possible to provide the control energy for position (angle) and the control energy for force independently, in other words, to control position (angle) and force independently.

Function Fulfilled by Hardware or Software

The functions for performing the series of processes according to the embodiment described above can be fulfilled by using hardware, can be fulfilled by using software, or can be fulfilled by using a combination thereof. In other words, an aspect to fulfill the functions is not particularly limited provided that the functions for performing the series of processes described above are fulfilled by the operational data management system.

For example, in the case where the functions for performing the series of processes described above are fulfilled by a processor that performs an arithmetic operation, examples of the processor that performs the arithmetic operation include processing apparatus such as a single processor, multiple processors, or a multi-core processor, and a combination of the processing apparatus and a processing circuit such as an ASIC (Application Specific Integrated Circuit) or a FPGA (Field-Programmable Gate Array).

For example, in the case where the functions for performing the series of processes described above are fulfilled by using software, a program that is included in the software is install in a computer via a network or a recording medium. In this case, the computer may be a computer into which exclusive hardware is incorporated or may be a general-purpose computer (for example, a typical electronic device such as a general-purpose personal computer) that can perform a predetermined function by installing a program. Steps of a written program may include only processes that are sequentially performed in time series and may include processes that are performed in parallel or processes that are separately performed. The steps of the written program may be performed in a freely selected order without departing from the spirit of the present invention.

The recording medium in which the program is recorded may be provided to a user by being distributed separately from the computer or may be provided to a user with the recording medium incorporated into the computer in advance. In this case, examples of the removable media 50, recording medium that is distributed separately from the computer include a magnetic disk (including a floppy disk), an optical disk, and a magneto-optical disk. Examples of the optical disk include a CD-ROM (Compact Disc-Read Only Memory), a DVD (Digital Versatile Disc), and a Blu-ray (register trademark) Disc (a Blu-ray Disc). Examples of the magneto-optical disk include a MD (Mini Disc). Examples of the recording medium that is provided to a user in a state that is pre-installed in the computer main body is, for example, the storage unit 32 or the storage unit 42 in which programs are recorded, such as an HDD (hard disk drive) or an SSD (Solid State Drive). Drive).

REFERENCE SIGNS LIST

10-1, . . . , 10-$i$ first drive device, 11,21 driver, 12,22 actuator, 13,23 position sensor, 15 first mechanism, 20-1, . . . , 20-$j$ second drive device, 25 second mechanism, 30-1, . . . , 30-$k$ control device, 31,41 processor, 32,42 storage unit, 33,43 ROM, 34,44 RAM, 35,45 communication unit, 46 input unit, 47 output unit, 48 drive, 40 operational data management device, 50 removable medium, 311 force tactile sensation controller, 312,411 operational data acquisition unit, 313 provision data acquisition unit, 321,421 operational data storage unit, 322 provision data storage unit, 412 operation decomposer, 413 tag assigner, 414 normalization processor, 415 database management unit, 416 provision request responder, 417 UI controller, CS control target system, FT force velocity assignment transformation block, FC ideal force source block, PC ideal velocity (position) source block, IFT reverse transformation block, N network, S operational data management system

The invention claimed is:
1. An operational data management system comprising:
an acquirer that acquires, as operational data, a time-series control parameter used to transmit force tactile sensation between devices;
an assignor that assigns, as identification information, information on operation content implemented by the operational data to the operational data acquired by the acquirer; and a manager that accumulates a plurality of pieces of operational data, each of which is assigned the identification information by the assignor, and that manages the plurality of pieces of operational data so that desired operational data is searchable from the accumulated plurality of pieces of operational data based on the identification information.

2. The operational data management system according to claim 1, further comprising:
a provider that provides operational data retrieved based on the identification information to a control device that performs control to transmit force tactile sensation; and
a normalization processor that normalizes the operational data acquired by the acquirer, based on an attribute of a target device to which force tactile sensation is transmitted through the operational data, and that denormalizes the operational data provided by the provider, based on an attribute of a target device to which force tactile sensation is transmitted through the operational data.

3. The operational data management system according to claim 2, wherein the provider links a plurality of pieces of operational data retrieved based on the identification information, and provides, to the control device, single operational data including the plurality of pieces of operational data as components.

4. The operational data management system according to claim 1, further comprising:
a decomposer that decomposes single continuous operational data acquired by the acquirer into multiple pieces according to a plurality of operation contents implemented by the operational data to produce a plurality of pieces of operational data.

5. The operational data management system according to claim 1, wherein the manager excludes part of the accumulated plurality of pieces of operational data from a search target based on at least one of an attribute of a target device to which force tactile sensation is transmitted through operational data retrieved based on the identification information, an attribute of a control device that performs control to transmit force tactile sensation to the target device, and an attribute of a target contact object to be in contact with the target device in an operation of the target device.

6. The operational data management system according to claim 1, wherein the manager transmits force tactile sensation to a virtual device through operational data retrieved based on the identification information to implement an operation of the virtual device, and displays the implemented operation of the virtual device.

7. The operational data management system according to claim 1, wherein when a first driver that moves a first movement target upon execution of a predetermined operation, a first position information acquirer that acquires first position information on position of the first movement target moved by the first driver, a second driver that moves a second movement target upon execution of the predetermined operation, a second position information acquirer that acquires second position information on position of the second movement target moved by the second driver, and a controller that controls the first driver so as to output a position and a force corresponding to an operation indicated by the second position information based on the first position information, and the second position information which serves as a reference for an operation of the first driver, and controls the second driver so as to output a position and a force corresponding to an operation indicated by the first position information based on the second position information, and the first position information which serves as a reference for an operation of the second driver are present,
the acquirer acquires, as the operational data, at least part of time-series control parameters used by the controller to control the first driver and the second driver.

8. An operational data management method comprising:
acquiring, as operational data, a time-series control parameter used to transmit force tactile sensation between devices;
assigning, as identification information, information on operation content implemented by the operational data to the operational data acquired in the acquisition step; and
accumulating a plurality of pieces of operational data, each of which is assigned the identification information in the assigning, step, and managing the plurality of pieces of operational data so that desired operational data is searchable from the accumulated plurality of pieces of operational data based on the identification information.

9. A non-transitory storage medium encoded with a computer-readable program that controls a processor of a computer to execute:
acquiring, as operational data, a time-series control parameter used to transmit force tactile sensation between devices;
assigning, as identification information, information on operation content implemented by the operational data to the operational data acquired by the acquisition function; and
accumulating a plurality of pieces of operational data, each of which is assigned the identification information by the assigning, and managing the plurality of pieces of operational data so that desired operational data is searchable from the accumulated plurality of pieces of operational data based on the identification information.

* * * * *